US010735124B2

(12) United States Patent
Ji et al.

(10) Patent No.: US 10,735,124 B2
(45) Date of Patent: Aug. 4, 2020

(54) POLARIZATION INDEPENDENT OPTICAL DEVICE

(71) Applicant: HUAWEI TECHNOLOGIES CO., LTD., Shenzhen, Guangdong (CN)

(72) Inventors: Ruiqiang Ji, Dongguan (CN); Xin Tu, Shenzhen (CN); Yanbo Li, Dongguan (CN); Shengmeng Fu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/441,658

(22) Filed: Jun. 14, 2019

(65) Prior Publication Data

US 2019/0296850 A1 Sep. 26, 2019

Related U.S. Application Data

(63) Continuation of application No. PCT/CN2018/082192, filed on Apr. 8, 2018.

(30) Foreign Application Priority Data

May 11, 2017 (CN) .......................... 2017 1 0330536

(51) Int. Cl.

*H04J 14/02* (2006.01)
*G02B 6/293* (2006.01)
*H04J 14/06* (2006.01)

(52) U.S. Cl.

CPC .......... *H04J 14/0201* (2013.01); *G02B 6/293* (2013.01); *G02B 6/29338* (2013.01);
(Continued)

(58) Field of Classification Search

None
See application file for complete search history.

(56) References Cited

U.S. PATENT DOCUMENTS 6,195,187 B1 * 2/2001 Soref ................. G02B 6/12007 398/9
6,411,752 B1 * 6/2002 Little ................. G02B 6/12002 385/17

(Continued)

FOREIGN PATENT DOCUMENTS

CN 1164030 A 11/1997
CN 1760707 A 4/2006

(Continued)

OTHER PUBLICATIONS

Li et al., Silicon polarization independent microring resonator-based optical tunable filter circuit with fiber assembly, 2011, OSA (Year: 2011).*

(Continued)

*Primary Examiner* — Jai M Lee
(74) *Attorney, Agent, or Firm* — Fish & Richardson P.C.

(57) ABSTRACT

Examples of a polarization independent optical device are described. One example polarization independent optical device includes an input/output preprocessing optical path and M add/drop optical paths. Any add/drop optical path can be configured to drop a first $Q_{TE}$ and a first $P_{TE}$ that meet a resonance condition of a microring included in the add/drop optical path such that each add/drop optical path can be configured to drop a desired optical signal. Any add/drop optical path can also be configured to transmit an input optical signal to the input/output preprocessing optical path. Therefore, when any of the M add/drop optical paths is configured to drop a desired optical signal, another add/drop optical path can be configured to add a desired optical signal.

9 Claims, 9 Drawing Sheets

(52) U.S. Cl.
CPC ..... *G02B 6/29383* (2013.01); *G02B 6/29395* (2013.01); *G02B 6/29397* (2013.01); *H04J 14/06* (2013.01)

(56) References Cited

U.S. PATENT DOCUMENTS

| | | | | |
|---|---|---|---|---|
| 7,505,648 | B2 | 3/2009 | Klein et al. | |
| 8,314,988 | B2 * | 11/2012 | Little | G02B 6/29397 359/489.08 |
| 8,891,922 | B2 * | 11/2014 | Krug | G02B 6/12007 385/50 |
| 9,261,754 | B2 * | 2/2016 | Xu | G02F 1/353 |
| 10,250,350 | B2 * | 4/2019 | Testa | H04J 14/0204 |
| 10,261,262 | B2 * | 4/2019 | Thylen | G02B 6/3594 |
| 10,359,568 | B2 * | 7/2019 | Hu | G02B 6/29338 |
| 2002/0154845 | A1 | 10/2002 | Xie et al. | |
| 2004/0114929 | A1 * | 6/2004 | Madsen | H04J 14/0298 398/79 |
| 2004/0247227 | A1 * | 12/2004 | Eder | G02B 6/12007 385/11 |
| 2008/0123188 | A1 * | 5/2008 | Klein | G02B 6/12007 359/484.09 |
| 2014/0112669 | A1 * | 4/2014 | Mizrahi | H04J 14/0282 398/139 |
| 2015/0381301 | A1 * | 12/2015 | Jeong | G02B 6/29397 398/79 |
| 2018/0375583 | A1 * | 12/2018 | Wang | H04B 10/00 |

FOREIGN PATENT DOCUMENTS

| | | | |
|---|---|---|---|
| CN | 102565952 | A | 7/2012 |
| CN | 102687049 | A | 9/2012 |
| CN | 104238023 | A | 12/2014 |
| CN | 105676370 | A | 6/2016 |
| CN | 205609949 | U | 9/2016 |
| JP | 2001337247 | A | 12/2001 |
| JP | 2009244326 | A | 10/2009 |

OTHER PUBLICATIONS

Extended European Search Report issued in European Application No. 18799266.4 dated Sep. 18, 2019, 8 pages.

Zou et al., "An SOI Based Polarization Insensitive Filter for All-Optical Clock Recovery", OFC 2014 OSA, XP032632867, Mar. 9, 2014, pp. 1-3.

Fukuda et al., "Silicon photonic circuit with polarization diversity," Optical Society of America, Optics Express, vol. 16, No. 7, Mar. 26, 2008, 9 pages.

Doerr et al., "An Automatic 40-Wavelength Channelized Equalizer," IEEE Photonics Technology Letters, vol. 12, No. 9, Sep. 2000, pp. 1195-1197.

PCT International Search Report and Written Opinion issued in International Application No. PCT/CN2018/082192 dated Jun. 22, 2018, 12 pages (partial English translation).

Office Action issued in Chinese Application No. 201710330536.3 dated Apr. 10, 2019, 9 pages (with English translation).

* cited by examiner

Cascaded-into polarization independent optical device 801

Cascaded-into polarization independent optical device 802

POLARIZATION INDEPENDENT OPTICAL DEVICE

CROSS-REFERENCE TO RELATED APPLICATIONS

This application is a continuation of International Application No. PCT/CN2018/082192, filed on Apr. 8, 2018, which claims priority to Chinese Patent Application No. 201710330536.3, filed on May 11, 2017. The disclosures of the aforementioned applications are hereby incorporated by reference in their entireties.

TECHNICAL FIELD

This application relates to the field of fiber optic communications, and in particular, to a polarization independent optical device.

BACKGROUND

With development of optical device integration technologies, a size of an optical device can reach a micron scale currently, so that a cross-sectional area of a waveguide, in the optical device, for transmitting an optical signal also reaches a micron scale. In this case, two components of the optical signal, that is, a transverse electric (TE) mode and a transverse magnetic (TM) mode, have great differences in terms of an effective refractive index difference, a group refractive index, and the like, resulting in generation of polarization dependent loss (PDL) and polarization mode dispersion (PMD) when the optical signal is transmitted in the optical device. In this case, the optical device is referred to as a polarization dependent optical device. When an optical signal is transmitted in the polarization dependent optical device, quality of the optical signal deteriorates due to existence of the PDL and the PMD. Therefore, a polarization independent characteristic is an essential requirement for an optical device in fiber optic communications. In addition, in a wavelength division system of the fiber optic communications, add/drop multiplexing usually needs to be performed on signals at different wavelengths. In other words, optical signals at different wavelengths need to be separated and combined. Therefore, how to construct a polarization independent optical device for performing optical signal add/drop multiplexing has drawn widespread attention.

FIG. 1 is a schematic structural diagram of an optical device for implementing optical signal add/drop multiplexing in a related technology. The optical device may be configured to drop optical signals at any wavelength in a wavelength division multiplexing (WDM) signal, or configured to add optical signals at different wavelengths. As shown in FIG. 1, when the optical device is configured to separate a WDM signal, the optical device includes one input port (Input), n output ports $R_{\lambda 1}$, $R_{\lambda 2}$, . . . , and $R_{\lambda n}$, and n microring filter units $\mathbf{100}_1$, $\mathbf{100}_2$, . . . , and $\mathbf{100}_n$. The microring filter unit $\mathbf{100}_1$ is configured to separate an optical signal at a wavelength $\lambda_1$, the microring filter unit $\mathbf{100}_2$ is configured to separate an optical signal at a wavelength $\lambda_2$, . . . , and the microring filter unit $\mathbf{100}_n$ is configured to separate an optical signal at a wavelength kn. The microring filter unit $\mathbf{100}_1$ is used as an example to illustrate a process of separating a WDM signal by the optical device, where the WDM signal includes n optical signals at different wavelengths $\lambda_1$, $\lambda_2$, . . . , and $\lambda_n$. When the WDM signal is input from the input port, an optical signal at each wavelength in the WDM signal is split into two components, that is, a TE mode and a TM mode, by using a polarization beam splitter (PBS) 101. The TE mode of each optical signal is marked as $Q_{TE}$, and the TM mode is marked as $P_{TM}$. $P_{TM}$ is converted to a TE polarization mode by using a polarization rotator (PR) 102, and the TE polarization mode is marked as $P_{TE}$. In addition, a microring 103 included in the microring filter unit $\mathbf{100}_1$ includes four ports: an input port, a throughput port, an add port, and a drop port. A $Q_{TE}$ is input from the input port of the microring 103. When a wavelength of an optical signal corresponding to the $Q_{TE}$ is $\lambda_1$ that meets a resonance condition of the microring 103, the $Q_{TE}$ is output from the drop port of the microring 103. A $P_{TE}$ corresponding to the $Q_{TE}$ is input from the throughput port of the microring 103, is output from the add port of the microring 103, and is converted to TM polarization $P_{TM}$ again by using another PR 104. The $Q_{TE}$ and the $P_{TM}$ are combined, and an optical signal at the wavelength $\lambda_1$ is output from the output port $R_{\lambda 1}$, so as to complete separation of the optical signal at the wavelength $\lambda_1$, that is, to drop the optical signal at the wavelength $\lambda_1$. The n optical signals at different wavelengths included in the WDM signal are separately separated by the n microring filter units $\mathbf{100}_1$, $\mathbf{100}_2$, . . . , and $\mathbf{100}_n$.

Similarly, when the optical device is configured to combine optical signals at different wavelengths, the foregoing n output ports $R_{\lambda 1}$, $R_{\lambda 2}$, . . . , and $R_{\lambda n}$ may act as n input ports, of the optical device, for lightwaves at different wavelengths, and the foregoing input port (Input) may act as an output port for a combined optical signal. Then, the n optical signals at different wavelengths are combined by using the n microring filter units $\mathbf{100}_1$, $\mathbf{100}_2$, . . . , and $\mathbf{100}_n$, that is, the n optical signals at different wavelengths are added by using the optical device. Polarization beam splitting and polarization rotation are performed on an optical signal before the optical signal enters a microring filter unit, so that the optical signal passing through the microring filter unit includes only one polarization mode. Therefore, even if a device included in the optical device is a polarization dependent device, no PDL or PMD is generated when the optical signal is transmitted in the optical device. In other words, the optical device is a polarization independent optical device.

When the optical device shown in FIG. 1 is used to separate a WDM signal, the optical device cannot be used to combine optical signals at different wavelengths; when the optical device is used to combine optical signals at different wavelengths, the optical device cannot be used to separate a WDM signal. Therefore, the optical device shown in FIG. 1 severely limits an optical signal add/drop multiplexing function.

SUMMARY

This application provides a polarization independent optical device to resolve a problem that an optical device in a related technology cannot be used to combine optical signals at different wavelengths and separate a WDM signal at the same time. A structure of the polarization independent optical device is as follows:

the polarization independent optical device includes an input/output preprocessing optical path and M add/drop optical paths, where each add/drop optical path includes a microring and a first polarization splitter and rotator PSR, and M is greater than 1;

input ports and throughput ports of M microrings included in the M add/drop optical paths are connected in a head-to-tail manner, a first lightwave transmission port of the input/ output preprocessing optical path is connected to an input port of a microring included in the $1^{st}$ add/drop optical path, and a second lightwave transmission port of the input/output preprocessing optical path is connected to a throughput port of a microring included in the $M^{th}$ add/drop optical path;

the input/output preprocessing optical path is configured to process each of a plurality of optical signals at different wavelengths in an input first wavelength division multiplexing WDM signal to obtain a first $Q_{TE}$ and a first $P_{TE}$, and transmit a plurality of first $Q_{TE}$s and a plurality of first $P_{TE}$s that are obtained through processing to the microrings included in the M add/drop optical paths, where $Q_{TE}$ indicates a transverse electric (TE) mode of an optical signal, and $P_{TE}$ indicates a TE polarization mode rotated from a transverse magnetic (TM) mode of the optical signal; and for any of the M add/drop optical paths, a microring included in the add/drop optical path is connected to a first PSR included in the add/drop optical path, where the microring included in the add/drop optical path is configured to transmit a first $Q_{TE}$ of the plurality of first $Q_{TE}$s that meets a resonance condition and a first $P_{TE}$ of the plurality of first $P_{TE}$s that meets the resonance condition to the first PSR connected to the microring; and the first PSR included in the add/drop optical path is configured to process the received first $Q_{TE}$ and the received first $P_{TE}$, and output the processed first $Q_{TE}$ and first $P_{TE}$; and the first PSR included in the add/drop optical path is further configured to process an input optical signal to obtain a second $Q_{TE}$ and a second $P_{TE}$, and transmit the second $Q_{TE}$ and the second PT to the microring connected to the first PSR; the microring included in the add/drop optical path is further configured to transmit the second $Q_{TE}$ and the second PT to the input/output preprocessing optical path; and the input/output preprocessing optical path is further configured to process the received second $Q_{TE}$ and the received second $P_{TE}$, and output the processed second $Q_{TE}$ and second $P_{TE}$.

Any add/drop optical path may be configured to drop a first $Q_{TE}$ and a first $P_{TE}$ that meet a resonance condition of a microring included in the add/drop optical path, that is, each add/drop optical path may be configured to drop a desired optical signal. Any add/drop optical path may also be configured to transmit an input optical signal to the input/output preprocessing optical path, that is, each add/drop optical path may also be configured to add a desired optical signal. Therefore, when any of the M add/drop optical paths is configured to drop a desired optical signal, another add/drop optical path may be configured to add a desired optical signal. In other words, the polarization independent optical device provided by this application can simultaneously drop a desired optical signal and add a desired optical signal.

Optionally, the microring included in the add/drop optical path is further configured to transmit a first $Q_{TE}$ of the plurality of first $Q_{TE}$s that does not meet the resonance condition and a first $P_{TE}$ of the plurality of first $P_{TE}$s that does not meet the resonance condition to the input/output preprocessing optical path; and the input/output preprocessing optical path is further configured to process the first $Q_{TE}$ that does not meet the resonance condition and the first $P_{TE}$ that does not meet the resonance condition, and output the processed first $Q_{TE}$ and first $P_{TE}$.

The polarization independent optical device provided by this application not only can simultaneously drop a desired optical signal and add a desired optical signal, but also can process the first $Q_{TE}$ and the first $P_{TE}$ in the first WDM signal that do not meet the resonance condition and output the processed first $Q_{TE}$ and first $P_{TE}$, so as to implement an optical signal pass-through function.

Optionally, the input/output preprocessing optical path includes a first input/output splitter and a second PSR, and the first input/output splitter is a polarization-insensitive optical device;

the first input/output splitter includes an input port, an output port, and a lightwave transmission port, and the second PSR includes a lightwave transmission port, a lightwave beam splitting port, and a lightwave beam splitting and rotation port;

the lightwave transmission port of the first input/output splitter is connected to the lightwave transmission port of the second PSR, the lightwave beam splitting port of the second PSR is connected to the input port of the microring included in the $1^{st}$ add/drop optical path of the M add/drop optical paths, and the lightwave beam splitting and rotation port of the second PSR is connected to the throughput port of the microring included in the $M^{th}$ add/drop optical path of the M add/drop optical paths;

the first input/output splitter is configured to transmit the first WDM signal received by the included input port to the second PSR by using the lightwave transmission port included in the first input/output splitter; the second PSR is configured to process a plurality of optical signals at different wavelengths in the first WDM signal received by the included lightwave transmission port to obtain a plurality of first $Q_{TE}$s and a plurality of first $P_{TE}$s, transmit, by using the lightwave beam splitting port included in the second PSR, the plurality of first $Q_{TE}$s to the input port of the microring included in the $1^{st}$ add/drop optical path, and transmit, by using the lightwave beam splitting port included in the second PSR, the plurality of first $P_{TE}$s to the throughput port of the microring included in the $M^{th}$ add/drop optical path; and the second PSR is further configured to rotate the second $Q_{TE}$ received by the included lightwave beam splitting and rotation port to a second $Q_{TM}$, combine the second $Q_{TM}$ and the second $P_{TE}$ received by the lightwave beam splitting port included in the second PSR, and transmit the combined second $Q_{TM}$ and second $P_{TE}$ to the lightwave transmission port of the first input/output splitter by using the lightwave transmission port included in the second PSR; and the first input/output splitter is further configured to output the combined second $Q_{TM}$ and second $P_{TE}$ by using the output port included in the first input/output splitter, where $Q_{TM}$ is a TM polarization mode rotated from $Q_{TE}$.

The provided polarization independent optical device is applied to a scenario in which the input/output splitter included in the input/output preprocessing optical path is a polarization-insensitive optical device.

Optionally, the input/output preprocessing optical path includes a second input/output splitter, a third input/output splitter, a third PSR, and a fourth PSR, where both the second input/output splitter and the third input/output splitter are polarization-sensitive optical devices;

the second input/output splitter and the third input/output splitter each include an input port, an output port, and a lightwave transmission port, and the third PSR and the fourth PSR each include a lightwave transmission port, a lightwave beam splitting port, and a lightwave beam splitting and rotation port;

the lightwave beam splitting port of the third PSR is connected to the input port of the second input/output splitter, the lightwave beam splitting and rotation port of the third PSR is connected to the input port of the third input/output splitter, the output port of the second input/output splitter is connected to the lightwave beam splitting port of the fourth PSR, and the lightwave beam splitting and rotation port of the fourth PSR is connected to the output port of the third input/output splitter;

the lightwave transmission port of the second input/output splitter is connected to the input port of the microring included in the 1st add/drop optical path of the M add/drop optical paths, and the lightwave transmission port of the third input/output splitter is connected to the throughput port of the microring included in the Mth add/drop optical path of the M add/drop optical paths;

the third PSR is configured to process a plurality of optical signals at different wavelengths in the first WDM signal received by the included lightwave transmission port to obtain a plurality of first $Q_{TE}$s and a plurality of first $P_{TE}$s, transmit the plurality of first $Q_{TE}$s to the input port of the second input/output splitter by using the lightwave beam splitting port included in the third PSR, and transmit the plurality of first $P_{TE}$s to the input port of the third input/output splitter by using the lightwave beam splitting and rotation port included in the third PSR; the second input/output splitter is configured to transmit, by using the included lightwave transmission port, the plurality of first $Q_{TE}$s to the microrings included in the M add/drop optical paths; and the third input/output splitter is configured to transmit, by using the included lightwave transmission port, the plurality of first $P_{TE}$s to the microrings included in the M add/drop optical paths; and the third input/output splitter is further configured to receive the second $Q_{TE}$ by using the included lightwave transmission port, and transmit the second $Q_{TE}$ to the lightwave beam splitting and rotation port of the fourth PSR by using the output port included in the third input/output splitter; the second input/output splitter is further configured to receive the second $P_{TE}$ by using the included lightwave transmission port, and transmit the second $P_{TE}$ to the lightwave beam splitting port of the fourth PSR by using the output port included in the second input/output splitter; and the fourth PSR is further configured to rotate the second $Q_{TE}$ to a second $Q_{TM}$, combine the second $Q_{TM}$ and the second $P_{TE}$, and output the combined second $Q_{TM}$ and second $P_{TE}$ by using the lightwave transmission port included in the fourth PSR.

The provided polarization independent optical device is applied to a scenario in which the input/output splitter included in the input/output preprocessing optical path is a polarization-sensitive optical device.

Optionally, the microring included in the add/drop optical path further includes an add port and a drop port, and the first PSR included in the add/drop optical path includes a lightwave transmission port, a lightwave beam splitting port, and a lightwave beam splitting and rotation port;

the add port of the microring included in the add/drop optical path is connected to the lightwave beam splitting port of the first PSR included in the add/drop optical path, and the drop port of the microring included in the add/drop optical path is connected to the lightwave beam splitting and rotation port of the first PSR included in the add/drop optical path;

the first PSR is configured to rotate a first $Q_{TE}$ that is received by the included lightwave beam splitting and rotation port and that meets the resonance condition to a first $Q_{TM}$, combine the first $Q_{TM}$ and a first $P_{TE}$ that is received by the lightwave beam splitting port and that meets the resonance condition, and output the combined first $Q_{TM}$ and first $P_{TE}$ by using the lightwave transmission port included in the first PSR; and the first PSR is further configured to process an optical signal input by the included lightwave transmission port to obtain a second $Q_{TE}$ and a second $P_{TE}$, transmit the second $Q_{TE}$ to the add port of the microring by using the lightwave beam splitting port included in the first PSR, and transmit the second $P_{TE}$ to the drop port of the microring by using the lightwave beam splitting port included in the first PSR.

For any of the M add/drop optical paths in the polarization independent optical device, the microring included in the add/drop optical path is connected, by using a port, to the first PSR included in the add/drop optical path.

Optionally, the add/drop optical path further includes a fourth input/output splitter;

the fourth input/output splitter includes an input port, an output port, and a lightwave transmission port;

the lightwave transmission port of the first PSR is connected to the lightwave transmission port of the fourth input/output splitter; and the input port of the fourth input/output splitter is configured to input a to-be-added optical signal, and the output port of the fourth input/output splitter is configured to output a to-be-dropped optical signal.

Further, to enable each add/drop optical path to simultaneously drop an optical signal and add an optical signal, each add/drop optical path may further include a fourth input/output splitter.

Optionally, the microring is a resonance wavelength tunable microring, and a free spectral range FSR of the microring covers wavelengths of all optical signals included in the first WDM signal and a second WDM signal, where the second WDM signal is an optical signal output from the polarization independent optical device.

To enable a microring included in each add/drop optical path to drop an optical signal at any wavelength in the first WDM and add an optical signal at any wavelength, the microring provided by this application is a resonance wavelength tunable microring.

Optionally, any one of the first input/output splitter, the second input/output splitter, the third input/output splitter, and the fourth input/output splitter is a multi-port optical circulator or a multi-port coupler.

The input/output splitter provided by this application may be a multi-port optical circulator or a multi-port coupler.

Optionally, an optical transmission path length, in the polarization independent optical device, of the first $Q_{TE}$ of the plurality of first $Q_{TE}$s that meets the resonance condition is the same as an optical transmission path length, in the polarization independent optical device, of the first $P_{TE}$ of the plurality of first $P_{TE}$s that meets the resonance condition; an optical transmission path length, in the polarization independent optical device, of the first $Q_{TE}$ of the plurality of first $Q_{TE}$s that does not meet the resonance condition is the same as an optical transmission path length, in the polarization independent optical device, of the first $P_{TE}$ of the plurality of first $P_{TE}$s that does not meet the resonance condition; and an optical transmission path length of the second $Q_{TE}$ in the polarization independent optical device is the same as an optical transmission path length of the second $P_{TE}$ in the polarization independent optical device.

Further, optical transmission path lengths of two components of an optical signal in the polarization independent optical device are the same, so as to reduce PDL.

The technical solutions provided by this application bring the following beneficial effects.

The polarization independent optical device provided by this application includes the input/output preprocessing optical path and the M add/drop optical paths. The input/output preprocessing optical path may process each of a plurality of optical signals at different wavelengths in the first WDM signal to obtain the first $Q_{TE}$ and the first $P_{TE}$. $Q_{TE}$ indicates a TE mode of an optical signal, and $P_{TE}$ indicates a TE polarization mode rotated from a TM mode of the optical signal. In other words, the first WDM signal includes only one polarization mode after being processed by the input/output preprocessing optical path. Therefore, the optical device provided by this application is a polarization independent optical device. In addition, any add/drop optical path may be configured to drop the first $Q_{TE}$ and the first $P_{TE}$ that meet the resonance condition of the microring included in the add/drop optical path, that is, each add/drop optical path may be configured to drop a desired optical signal. Any add/drop optical path may also be configured to transmit an input optical signal to the input/output preprocessing optical path, that is, each add/drop optical path may also be configured to add a desired optical signal. Therefore, when any of the M add/drop optical paths is configured to drop a desired optical signal, another add/drop optical path may be configured to add a desired optical signal. In other words, the polarization independent optical device provided by this application can simultaneously drop a desired optical signal and add a desired optical signal.

BRIEF DESCRIPTION OF DRAWINGS

FIG. 7B(b) is a schematic diagram of a cascading manner of another polarization independent optical device according to an embodiment of the present invention;

DESCRIPTION OF EMBODIMENTS

To make the objectives, technical solutions, and advantages of this application clearer, the following further describes the implementations of this application in detail with reference to the accompanying drawings.

A structure and functions of an optical device in the embodiments of the present invention are briefly described before the embodiments of the present invention are explained in detail.

(1) Microring

Figure 1:
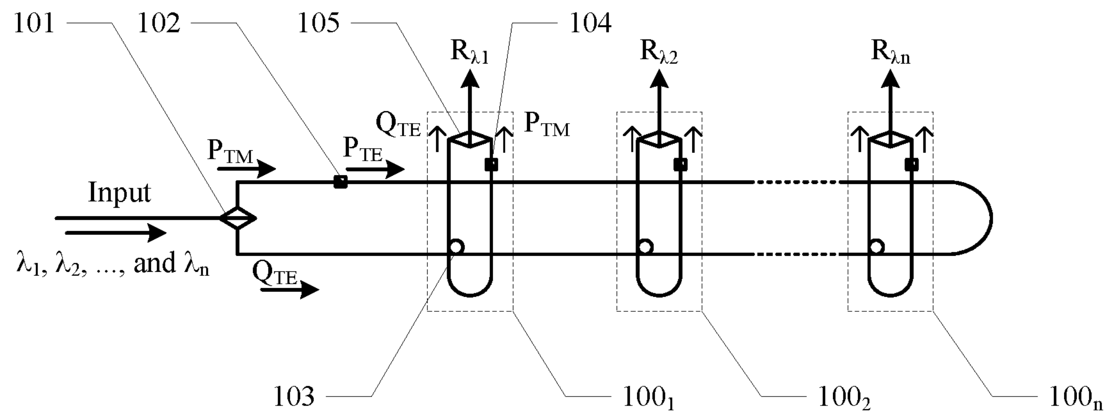
FIG. 1 is a schematic structural diagram of an optical device for implementing optical signal add/drop multiplexing in a related technology.
Figure 2A:
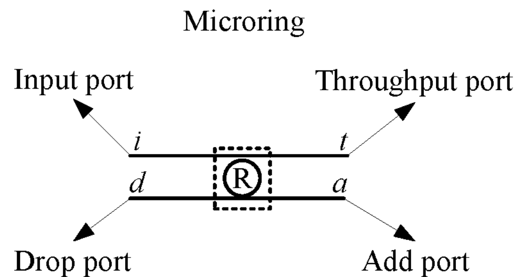
FIG. 2A is a schematic structural diagram of a microring according to an embodiment of the present invention.

A microring is an optical filtering structure. FIG. 2A is a schematic structural diagram of a microring according to an embodiment of the present invention. As shown in FIG. 2A, the microring includes two parallel straight waveguides and a ring waveguide R coupled with the two parallel straight waveguides. The two straight waveguides may be coupled with the ring waveguide R by using a directional coupler or a multimode interference (MMI) coupler. The microring obtained after coupling includes four ports: an input port, a throughput port, a drop port, and an add port. For ease of description, in FIG. 2A and the accompanying drawings in the following embodiments, the input port of the microring is marked as i, the throughput port of the microring is marked as t, the drop port of the microring is marked as d, and the add port of the microring is marked as a.

As shown in FIG. 2A, when an optical signal meeting a resonance condition is input from a port of a straight waveguide, the optical signal is output from a corresponding port of the other straight waveguide. In other words, when an optical signal meeting the resonance condition is input from the input port of the microring, the optical signal is output from the drop port of the microring; when an optical signal meeting the resonance condition is input from the throughput port of the microring, the optical signal is output from the add port of the microring; when an optical signal meeting the resonance condition is input from the drop port of the microring, the optical signal is output from the input port of the microring; when an optical signal meeting the resonance condition is input from the add port of the microring, the optical signal is output from the throughput port of the microring. A wavelength of an optical signal meeting the resonance condition meets the following formula:

$$L \times N_{eff} = m\lambda, \text{ where}$$

m is an integer, L is a circumference of the ring waveguide included in the microring, $N_{eff}$ is an effective refractive index of the ring waveguide R, and $\lambda$ is the wavelength of the optical signal meeting the resonance condition.

When an optical signal that does not meet the resonance condition is input from a port of a straight waveguide of the microring, the optical signal is output from the other port of the straight waveguide. In other words, when an optical signal that does not meet the resonance condition is input from the input port of the microring, the optical signal is output from the throughput port of the microring; when an optical signal that does not meet the resonance condition is input from the drop port of the microring, the optical signal is output from the add port of the microring.

For example, three optical signals $\lambda_1$, $\lambda_2$, and $\lambda_3$ at different wavelengths are input from the input port of the microring shown in FIG. 2A, and an optical signal $\lambda_4$ at another wavelength is input from the add port of the microring, where $\lambda_2$ and $\lambda_4$ are optical signals that meet the resonance condition of the microring. In this case, the optical signal $\lambda_2$ input from the input port of the microring is output from the drop port of the microring, and the optical signal $\lambda_4$ input from the add port of the microring is output from the throughput port of the microring. The optical signals $\lambda_1$ and $\lambda_3$ that do not meet the resonance condition are output directly from the throughput port of the microring.

It should be noted that the microring provided by this embodiment of the present invention is a resonance wavelength tunable microring. To be specific, ambient environment information of the microring, such as temperature, may be adjusted to adjust a resonance wavelength of the microring. For ease of description, a WDM signal input to a polarization independent optical device provided by this embodiment of the present invention is referred to as a first WDM signal. Because the resonance wavelength of the microring is tunable, to enable the mirroring to drop an optical signal at any wavelength in optical signals at different wavelengths included in an input WDM signal, a free spectral range (FSR) of the mirroring needs to cover wavelengths of all optical signals included in the first WDM signal and a second WDM signal.

(2) Polarization Splitter and Rotator (PSR)

Figure 2B:
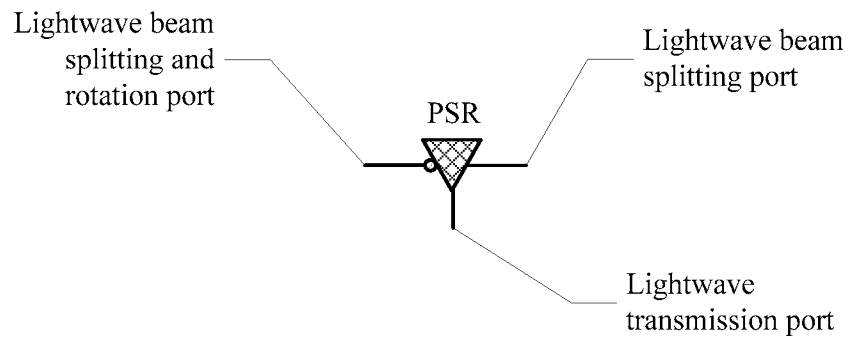
FIG. 2B is a schematic structural diagram of a PSR according to an embodiment of the present invention.

A PSR is an optical device that can simultaneously perform polarization beam splitting processing and polarization rotation processing on an optical signal. FIG. 2B is a schematic structural diagram of a PSR according to an embodiment of the present invention. As shown in FIG. 2B, the PSR includes three ports: a lightwave transmission port, a lightwave beam splitting and rotation port, and a lightwave beam splitting port.

When an optical signal is input from the lightwave transmission port of the PSR, the PSR performs polarization beam splitting processing on the input optical signal to obtain two components $Q_{TE}$ and $P_{TM}$ of the optical signal. The PSR outputs one of the two components from the optical beam splitting port, performs polarization rotation processing on the other component, and outputs the other component processed through polarization rotation from the lightwave beam splitting and rotation port of the PSR. For example, the PSR outputs the $Q_{TE}$ from the lightwave beam splitting port. At the same time, the PSR rotates the other component of the optical signal to a TE polarization mode, that is, rotates the $P_{TM}$ to $P_{TE}$, and outputs the $P_{TE}$ from the lightwave beam splitting and rotation port of the PSR.

When two components of an optical signal are input from the lightwave beam splitting port and the lightwave beam splitting and rotation port of the PSR, respectively, the PSR performs polarization rotation processing on the component input from the lightwave beam splitting and rotation port, combines the component processed through polarization rotation and the other component input from the lightwave beam splitting port, to obtain the optical signal, and outputs the optical signal from the lightwave transmission port of the PSR. For example, when the PSR receives a component $P_{TE}$ of an optical signal from the lightwave beam splitting port and receives the other component $Q_{TE}$ of the optical signal from the lightwave beam splitting and rotation port, the PSR rotates the $Q_{TE}$ to a TM polarization mode, that is, rotates the $Q_{TE}$ to $Q_{TM}$, combines the $P_{TE}$ and the $Q_{TM}$, and outputs the combined $P_{TE}$ and $Q_{TM}$ from the lightwave transmission port of the PSR. $Q_{TM}$ is a TM polarization mode rotated from $Q_{TE}$.

(3) Input/Output Splitter

An input/output splitter is an optical device that separates an input port of an optical signal and an output port of the optical signal. The input/output splitter may be a multi-port circulator or a multi-port coupler.

Figure 2C:
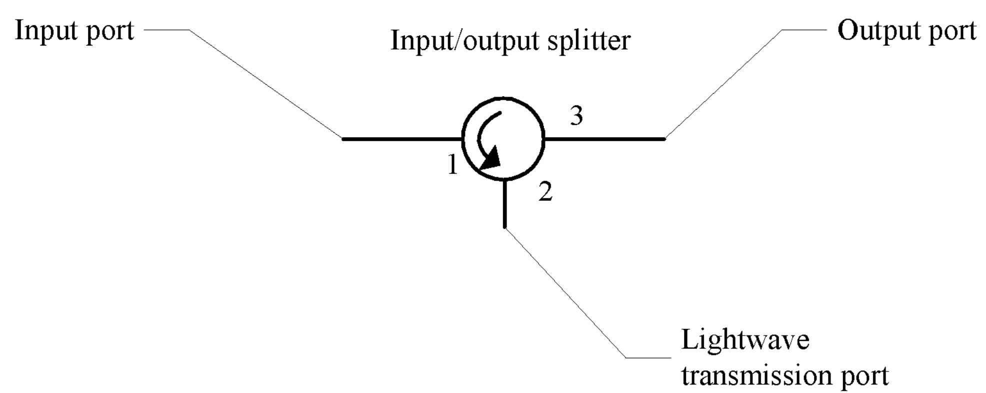
FIG. 2C is a schematic structural diagram of an input/output splitter according to an embodiment of the present invention.

FIG. 2C is a schematic structural diagram of an input/output splitter according to an embodiment of the present invention. The input/output splitter is a 3-port circulator, and the 3-port circulator includes three ports: an input port, a lightwave transmission port, and an output port. A main function of the 3-port circulator is to output an optical signal input to any of the three ports from a next port in a specific direction order. In other words, when an optical signal is input from the input port, the optical signal is output from the lightwave transmission port of the 3-port circulator; when an optical signal is input from the lightwave transmission port, the optical signal is output from the output port of the 3-port circulator. It should be noted that the specific direction order is a preset order. As shown in FIG. 2C, the preset order is an order of 1-2-3. When an optical signal is transmitted in an order reverse to the preset order, energy of the optical signal is attenuated.

In addition, an application scenario of this embodiment of the present invention is described. With development of optical device integration technologies, an optical device is becoming smaller. When an optical signal is transmitted in a relatively small optical device, quality of the optical signal deteriorates due to existence of PDL and PMD. Therefore, a polarization independent feature is a challenge to an integrated optical device, and this application is applied to a scenario of constructing a polarization independent optical device that is configured to perform add/drop multiplexing on an optical signal.

With reference to the accompanying drawings, the following describes in detail a polarization independent optical device provided by the embodiments of the present invention and a method for performing add/drop multiplexing on a WDM signal by using the polarization independent optical device. For ease of description, a WDM optical signal input to the polarization independent optical device is referred to as a first WDM signal, and a WDM signal output from the polarization independent optical device is referred to as a second WDM signal.

Figure 3:
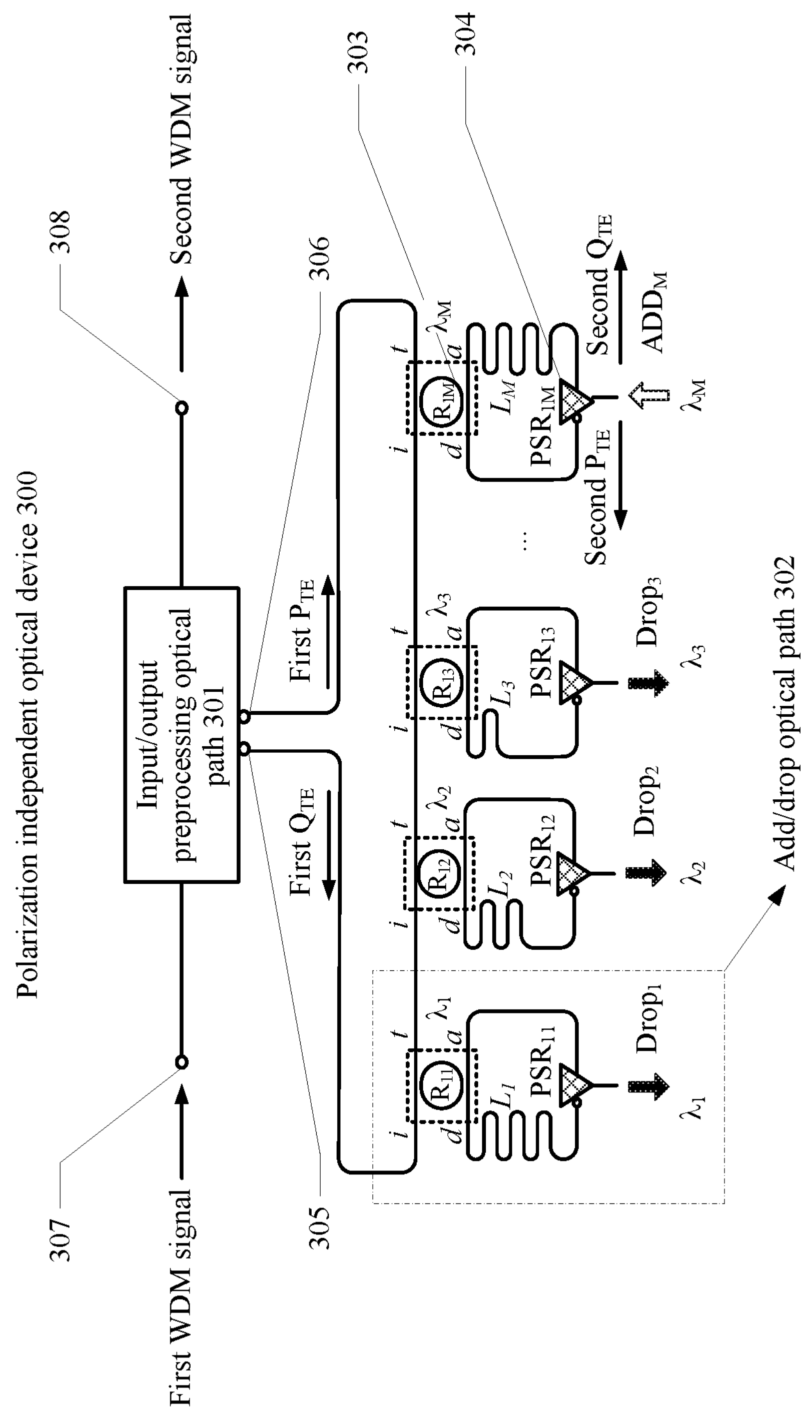
FIG. 3 is a schematic structural diagram of a polarization independent optical device according to an embodiment of the present invention.

FIG. 3 is a schematic structural diagram of a polarization independent optical device 300 according to an embodiment of the present invention. As shown in FIG. 3, the polarization independent optical device 300 includes an input/output preprocessing optical path 301 and M add/drop optical paths 302, where each add/drop optical path includes a microring 303 and a first PSR 304, and M is an integer greater than 1.

Input ports and throughput ports of M microrings included in the M add/drop optical paths 302 are connected in a head-to-tail manner, a first lightwave transmission port 305 of the input/output preprocessing optical path 301 is connected to an input port of a microring included in the $1^{st}$ add/drop optical path, and a second lightwave transmission port 306 of the input/output preprocessing optical path 301 is connected to a throughput port of a microring included in the $M^{th}$ add/drop optical path.

For any of the M add/drop optical paths, a microring included in the add/drop optical path is connected to a first PSR included in the add/drop optical path. Specifically, referring to FIG. 3, an add port of the microring included in the add/drop optical path is connected to a lightwave beam splitting port of the first PSR included in the add/drop optical path, and a drop port of the microring included in the add/drop optical path is connected to a lightwave beam splitting and rotation port of the first PSR included in the add/drop optical path. For specific locations of four ports of the microring and three ports of the first PSR in FIG. 3, refer to FIG. 2A and FIG. 2B, and details are not repeated in FIG. 3.

For better understanding of a structure of the polarization independent optical device 300 shown in FIG. 3, functions of the input/output preprocessing optical path 301 and the add/drop optical path 302 in the polarization independent optical device 300 are described herein.

The input/output preprocessing optical path 301 is configured to process each of a plurality of optical signals at different wavelengths in a first WDM signal input from an input port 307 to obtain a first $Q_{TE}$ and a first $P_{TE}$, and transmit a plurality of obtained first $Q_{TE}$s and a plurality of obtained first $P_{TE}$s to the microrings included in the M add/drop optical paths, where $Q_{TE}$ indicates a TE mode of an optical signal, and $P_{TE}$ indicates a TE polarization mode rotated from a TM mode of the optical signal.

For any add/drop optical path 302 of the M add/drop optical paths, a microring included in the add/drop optical path 302 is configured to transmit a first $Q_{TE}$ of the plurality of first $Q_{TE}$s that meets a resonance condition and a first $P_{TE}$ of the plurality of first $P_{TE}$s that meets the resonance condition to a first PSR connected to the microring; and the first PSR included in the add/drop optical path is configured to process the received first $Q_{TE}$ and the received first $P_{TE}$, and output the processed first $Q_{TE}$ and first $P_{TE}$.

Specifically, to ensure that two components of an optical signal are rotated in the polarization independent optical device for a same quantity of times to reduce PDL, the first PSR included in the add/drop optical path is configured to rotate the received first $Q_{TE}$ to a first $Q_{TM}$, combine the first $Q_{TM}$ and the received first $P_{TE}$, and output the combined first $Q_{TM}$ and first $P_{TE}$ by using an included lightwave transmission port. $Q_{TM}$ is a TM polarization mode rotated from $Q_{TE}$.

It should be noted that the first PSR included in the add/drop optical path may also be configured to rotate the received first $P_{TE}$, combine the rotated first $P_{TE}$ and the first $Q_{TE}$, and output the combined first $P_{TE}$ and first $Q_{TE}$ by using the included lightwave transmission port. In this case, for each add/drop optical path in the polarization independent optical device, a manner for connecting the microring and the first PSR in the add/drop optical path is reverse to the manner for connecting the microring and the first PSR shown in FIG. 3. In other words, the add port of the microring included in the add/drop optical path is connected to the lightwave beam splitting and rotation port of the first PSR included in the add/drop optical path, and the drop port of the microring included in the add/drop optical path is connected to the lightwave beam splitting port of the first PSR included in the add/drop optical path.

In addition, the microring included in the add/drop optical path is further configured to transmit a first $Q_{TE}$ of the plurality of first $Q_{TE}$s that does not meet the resonance condition and a first $P_{TE}$ of the plurality of first $P_{TE}$s that does not meet the resonance condition to the input/output preprocessing optical path. The input/output preprocessing optical path processes the first $Q_{TE}$ that does not meet the resonance condition and the first $P_{TE}$ that does not meet the resonance condition, and outputs the processed first $Q_{TE}$ and first $P_{TE}$. Specifically, the input/output preprocessing optical path is further configured to rotate the first $Q_{TE}$ that does not meet the resonance condition to a first $Q_{TM}$, combine the first $Q_{TM}$ and the first $P_{TE}$ that does not meet the resonance condition to obtain an optical signal in a second WDM signal, and output the optical signal in the second WDM signal by using an output port 308.

The first PSR 304 included in the add/drop optical path 302 is further configured to process an input optical signal to obtain a second $Q_{TE}$ and a second $P_{TE}$, and transmit the second $Q_{TE}$ and the second $P_{TE}$ to the microring 303 connected to the first PSR 304. Correspondingly, the microring 303 included in the add/drop optical path is further configured to transmit the second $Q_{TE}$ and the second $P_{TE}$ to the input/output preprocessing optical path 301. The input/output preprocessing optical path 301 processes the received second $Q_{TE}$ and second $P_{TE}$, and outputs the processed second $Q_{TE}$ and second $P_{TE}$. Specifically, the input/output preprocessing optical path 301 is further configured to rotate the second QT to a second $Q_{TM}$, combine the second $Q_{TM}$ and the second PT to obtain an optical signal in the second WDM signal, and output the optical signal in the second WDM signal by using the output port 308.

Further, to avoid PDL and PMD caused by different optical transmission path lengths of two components of an optical signal that are transmitted in the polarization independent optical device, lengths of two optical transmission paths of two components of an optical signal in the polarization independent optical device 300 shown in FIG. 3 are the same. In other words, an optical transmission path length, in the polarization independent optical device 300, of the first $Q_{TE}$ of the plurality of first $Q_{TE}$s that meets the resonance condition is the same as an optical transmission path length, in the polarization independent optical device 300, of the first $P_{TE}$ of the plurality of first $P_{TE}$s that meets the resonance condition; an optical transmission path length, in the polarization independent optical device 300, of the first $Q_{TE}$ of the plurality of first $Q_{TE}$s that does not meet the resonance condition is the same as an optical transmission path length, in the polarization independent optical device 300, of the first $P_{TE}$ of the plurality of first $P_{TE}$s that does not meet the resonance condition; and an optical transmission path length of the second $Q_{TE}$ in the polarization independent optical device 300 is the same as an optical transmission path length of the second $P_{TE}$ in the polarization independent optical device 300.

Specifically, a length of a waveguide, in the polarization independent optical device, for transmitting one component of an optical signal is determined to obtain a first length, and a length of a waveguide, in the polarization independent optical device, for transmitting the other component of the optical signal is determined to obtain a second length. When the first length and the second length are the same, lengths of two optical transmission paths of the two components of the optical signal in the polarization independent optical device are the same.

The following describes in detail an operating principle of the polarization independent optical device shown in FIG. 3. When the polarization independent optical device shown in FIG. 3 performs add/drop multiplexing on an optical signal, the following three processes are mainly included.

(1) A Process in which the Polarization Independent Optical Device 300 is Configured to Drop an Optical Signal As shown in FIG. 3, a first WDM signal is received from the input port 307 of the input/output preprocessing optical path 301, and a plurality of optical signals at different wavelengths in the first WDM signal are processed to obtain a plurality of first $Q_{TE}$s and a plurality of first $P_{TE}$s. The input/output preprocessing optical path 301 transmits the obtained plurality of first $Q_{TE}$s and the obtained plurality of first $P_{TE}$s to the microrings 303 included in the M add/drop optical paths. For any of the M add/drop optical paths, a microring 303 included in the upload/download optical path selects a first $Q_{TE}$ that meets the resonance condition from the plurality of first $Q_{TE}$s, selects a first $P_{TE}$ that meets the resonance condition from the plurality of first $P_{TE}$s, transmits the selected first $Q_{TE}$ and the selected first $P_{TE}$ to the first PSR 304, so that the first PSR 304 rotates the received first QT to a first $Q_{TM}$, combines the first $Q_{TM}$ and the received first $P_{TE}$, and outputs the combined first $Q_{TM}$ and first $P_{TE}$ by using the included lightwave transmission port, to obtain a to-be-dropped optical signal.

Specifically, the input/output preprocessing optical path 301 transmits, by using the first lightwave transmission port 305 included in the input/output preprocessing optical path 301, the obtained plurality of first $Q_{TE}$s to the input port of the microring 303 included in the 1st add/drop optical path. The input/output preprocessing optical path 301 transmits, by using the second lightwave transmission port 306 included in the input/output preprocessing optical path 301, the obtained plurality of first $P_{TE}$s to the throughput port of the microring included in the Mth add/drop optical path. For any of the M add/drop optical paths, the microring 303 included in the add/drop optical path transmits the selected first QT to the lightwave beam splitting and rotation port of the first PSR 304 by using the included drop port; and the microring 303 included in the add/drop optical path transmits the selected first PT to the lightwave beam splitting port of the first PSR 304 by using the included add port.

(2) A Process in which the Polarization Independent Optical Device 300 is Configured to Add an Optical Signal When the polarization independent optical device 300 is configured to add an optical signal, that is, when a first PSR 304 included in any of the M add/drop optical paths shown in FIG. 3 receives an input optical signal, the first PSR 304 processes the input optical signal to obtain a second $Q_{TE}$ and a second $P_{TE}$, and transmits the second $Q_{TE}$ and the second $P_{TE}$ to a microring 303 connected to the first PSR 304. The microring 303 transmits the second $Q_{TE}$ and the second $P_{TE}$ to the input/output preprocessing optical path 301. The input/output preprocessing optical path 301 rotates the second $Q_{TE}$ to a second $Q_{TM}$, combines the second $Q_{TM}$ and the second $P_{TE}$ to obtain an optical signal in a second WDM signal, and outputs the optical signal in the second WDM signal by using the output port 308 of the input/output preprocessing optical path 301.

Specifically, the first PSR 304 transmits the second $Q_{TE}$ to the add port of the microring 303 by using the included lightwave beam splitting port, and transmits the second $P_{TE}$ to the drop port of the microring 303 by using the included lightwave beam splitting and rotation port. The microring 303 transmits the second $Q_{TE}$ to the second lightwave transmission port 306 of the input/output preprocessing optical path 301 by using the included throughput port, and transmits the second $P_{TE}$ to the first lightwave transmission port 305 of the input/output preprocessing optical path 301 by using the included input port.

(3) A Process in which the Polarization Independent Optical Device 300 is Configured to Implement an Optical Signal Pass-Through Function For any of the M add/drop optical paths, the microring 303 included in the add/drop optical path transmits a first $Q_{TE}$ of the plurality of first $Q_{TE}$s that does not meet the resonance condition and a first $P_{TE}$ of the plurality of first $P_{TE}$s that does not meet the resonance condition to the input/output preprocessing optical path 301. The input/output preprocessing optical path 301 rotates the first $Q_{TE}$ that does not meet the resonance condition to a first $Q_{TM}$, combines the first $Q_{TM}$ and the first $P_{TE}$ that does not meet the resonance condition to obtain an optical signal in a second WDM signal, and outputs the optical signal in the second WDM signal by using the output port 308 of the input/output preprocessing optical path 301.

Specifically, the microring 303 included in the add/drop optical path transmits the first $Q_{TE}$ of the plurality of first $Q_{TE}$s that does not meet the resonance condition from the input port of the microring 303 to the throughput port of the microring 303, so as to transmit the first $Q_{TE}$ that does not meet the resonance condition to an input port of a microring included in a next add/drop optical path. When determining that the first $Q_{TE}$ does not meet the resonance condition, the microring of the next add/drop optical path outputs the first $Q_{TE}$ through a throughput port of the microring of the next add/drop optical path. The process proceeds until all the add/drop optical paths determine that the first $Q_{TE}$ does not meet the resonance condition. In this case, a microring of a last add/drop optical path transmits the first $Q_{TE}$ to the second lightwave transmission port 306 of the input/output preprocessing optical path 301 by using an included throughput port.

Correspondingly, an optical transmission path, in the polarization independent optical device 300, for the first $P_{TE}$ that does not meet the resonance condition is reverse to the optical transmission path of the first $Q_{TE}$ that does not meet the resonance condition. Details are not described herein.

For the polarization independent optical device 300 shown in FIG. 3, each add/drop optical path may be configured to drop a first $Q_{TE}$ and a first $P_{TE}$ that meet a resonance condition of a microring included in the add/drop optical path, that is, each add/drop optical path may be configured to drop a desired optical signal. Each add/drop optical path may also be configured to transmit an input optical signal to the input/output preprocessing optical path to obtain an optical signal in the second WDM signal, that is, each add/drop optical path may also be configured to add a desired optical signal. Therefore, when any of the M add/drop optical paths is configured to drop a desired optical signal, another add/drop optical path may be configured to add a desired optical signal. In other words, the polarization independent optical device 300 provided by this embodiment of the present invention can simultaneously drop a desired optical signal and add a desired optical signal.

The input/output splitter included in the input/output preprocessing optical path may be a polarization-sensitive optical device or a polarization-insensitive optical device, and therefore the input/output preprocessing optical path 301 shown in FIG. 3 have two structures. The following describes the two structures in detail.

Figure 4:
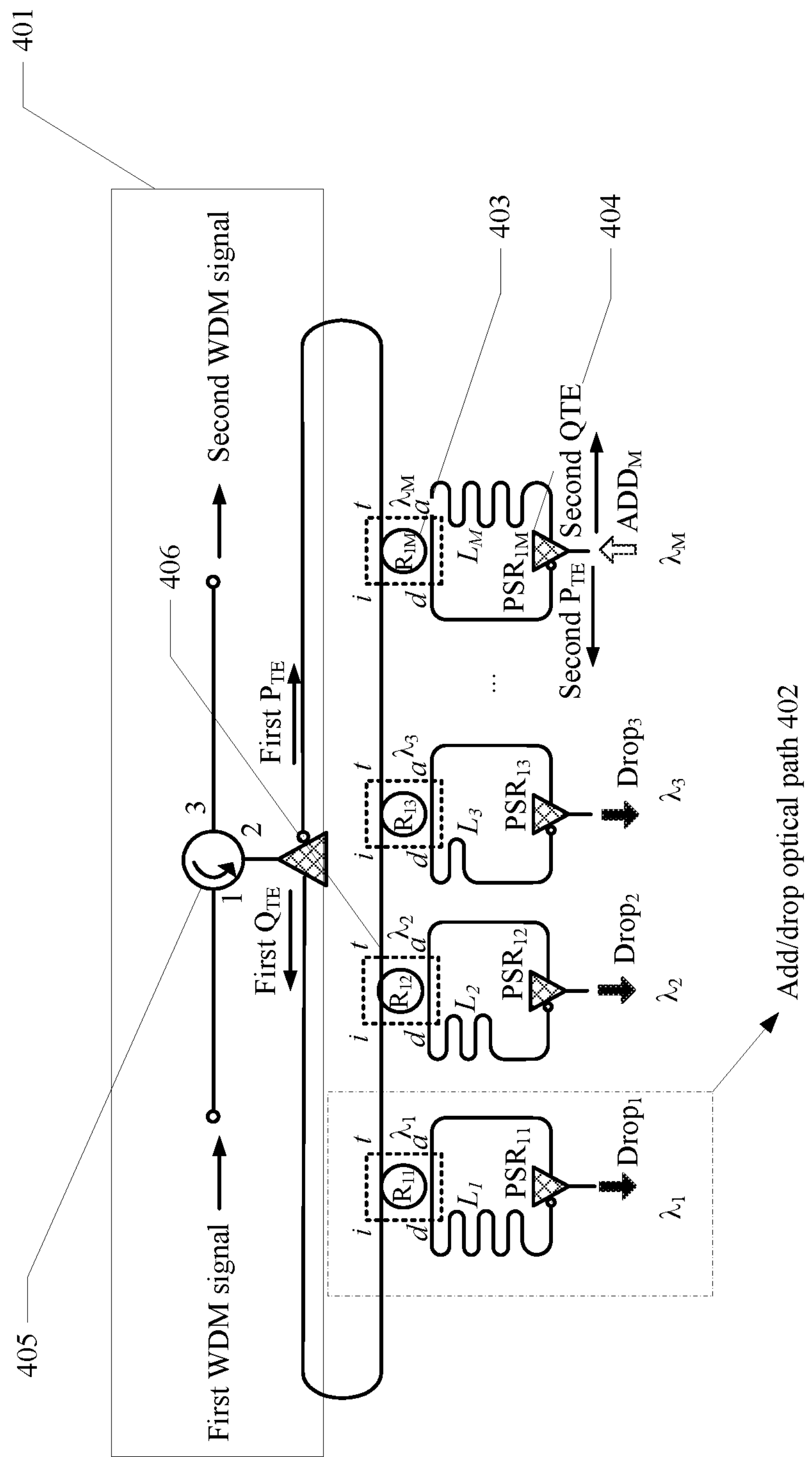
FIG. 4 is a schematic structural diagram of another polarization independent optical device according to an embodiment of the present invention.

FIG. 4 is a schematic structural diagram of another polarization independent optical device 400 according to an embodiment of the present invention. The polarization independent optical device is applied to a scenario in which an input/output splitter included in an input/output preprocessing optical path is a polarization-insensitive optical device. As shown in FIG. 4, the polarization independent optical device 400 includes an input/output preprocessing optical path 401 and M add/drop optical paths 402, where each add/drop optical path includes a microring 403 and a first PSR 404. The input/output preprocessing optical path 401 includes a first input/output splitter 405 and a second PSR 406.

The first input/output splitter 405 includes an input port, an output port, and a lightwave transmission port, and the second PSR 406 includes a lightwave transmission port, a lightwave beam splitting port, and a lightwave beam splitting and rotation port.

As shown in FIG. 4, the lightwave transmission port of the first input/output splitter 405 is connected to the lightwave transmission port of the second PSR 406, the lightwave beam splitting port of the second PSR 406 is connected to an input port of a microring 403 included in the $1^{st}$ add/drop optical path of the M add/drop optical paths, and the lightwave beam splitting and rotation port of the second PSR 406 is connected to a throughput port of a microring 403 included in the $M^{th}$ add/drop optical path of the M add/drop optical paths. For specific locations of four ports of the microring 403, three ports of the first PSR 404, the three ports of the first input/output splitter 405, and the three ports of the second PSR 406, refer to FIG. 2A, FIG. 2B, and FIG. 2C, and details are not repeated in FIG. 4 herein.

In this case, the input port of the first input/output splitter 405 is an input port of the input/output preprocessing optical path. In other words, the input port of the first input/output splitter 405 is configured to input a first WDM signal. The output port of the first input/output splitter 405 is an output port of the input/output preprocessing optical path. In other words, the output port of the first input/output splitter 405 is configured to output a second WDM signal.

A structure of the add/drop optical path of the polarization independent optical device shown in FIG. 4 is the same as that of the add/drop optical path of the polarization independent optical device shown in FIG. 3. Details are not described herein.

In addition, for the polarization independent optical device shown in FIG. 4, lengths of two optical transmission paths of two components of an optical signal in the polarization independent optical device also need to be the same. For a specific implementation process, refer to an implementation process of the polarization independent optical device shown in FIG. 3.

The following describes in detail an operating principle of the polarization independent optical device shown in FIG. 4. When the polarization independent optical device shown in FIG. 4 performs add/drop multiplexing on an optical signal, the following three processes are also included.

(1) A Process in which the Polarization Independent Optical Device 400 is Configured to Drop an Optical Signal The first input/output splitter 405 receives a first WDM signal by using the included input port, and transmits the first WDM signal to the second PSR 406 by using the lightwave transmission port included in the first input/output splitter 405. The second PSR 406 receives the first WDM signal by using the included lightwave transmission port, and processes a plurality of optical signals at different wavelengths in the first WDM signal to obtain a plurality of first $Q_{TE}$s and a plurality of first $P_{TE}$s. The second PSR 406 transmits, by using the included lightwave beam splitting port, the plurality of first $Q_{TE}$s to the microrings included in the M add/drop optical paths, and transmits, by using the included lightwave beam splitting and rotation port, the plurality of first $P_{TE}$s to the microrings included in the M add/drop optical paths.

Specifically, as shown in FIG. 4, the second PSR 406 transmits, by using the included lightwave beam splitting port, the plurality of first $Q_{TE}$s to an input port of a microring 403 included in the $1^{st}$ add/drop optical path, and transmits, by using the included lightwave beam splitting and rotation port, the plurality of first $P_{TE}$s to a throughput port of a microring 403 included in the $M^{th}$ add/drop optical path.

For any of the M add/drop optical paths, the microring 403 included in the add/drop optical path selects a first $Q_{TE}$ that meets a resonance condition from the plurality of first $Q_{TE}$s, and selects a first $P_{TE}$ that meets the resonance condition from the plurality of first $P_{TE}$s. The microring 403 transmits the selected first $Q_{TE}$ to the lightwave beam splitting and rotation port of the first PSR 404 by using an included drop port, and the microring 403 transmits the selected first $P_{TE}$ to the lightwave beam splitting port of the first PSR 404 by using an included add port, so that the first PSR rotates the received first $Q_{TE}$ to a first $Q_{TM}$, combines the first $Q_{TM}$ and the received first $P_{TE}$, and outputs the combined first $Q_{TM}$ and first $P_{TE}$ by using the lightwave transmission port included in the first PSR 404, to obtain a to-be-dropped optical signal.

(2) A Process in which the Polarization Independent Optical Device 400 is Configured to Add an Optical Signal When the first PSR 404 included in any of the M add/drop optical paths shown in FIG. 4 receives an input optical signal, the first PSR 404 processes the input optical signal to obtain a second $Q_{TE}$ and a second $P_{TE}$, and transmits the second $Q_{TE}$ and the second $P_{TE}$ to the microring 403 connected to the first PSR 404. The microring 403 transmits the second $Q_{TE}$ to the lightwave beam splitting and rotation port of the second PSR 406, and transmits the second $P_{TE}$ to the lightwave beam splitting port of the second PSR 406. The second PSR 406 rotates the second $Q_{TE}$ to a second $Q_{TM}$, combines the second $Q_{TM}$ and the second $P_{TE}$, and transmits the combined second $Q_{TM}$ and second $P_{TE}$ to the lightwave transmission port of the first input/output splitter 405 by using the lightwave transmission port included in the second PSR 406. The first input/output splitter 405 outputs the combined second $Q_{TM}$ and second $P_{TE}$ by using the included output port, to obtain an optical signal in the second WDM signal.

Specifically, the first PSR 404 transmits the second $Q_{TE}$ to the add port of the microring 403 by using the included lightwave beam splitting port, and transmits the second $P_{TE}$ to the drop port of the microring 403 by using the included lightwave beam splitting and rotation port. The microring 403 transmits the second $Q_{TE}$ to the lightwave beam splitting and rotation port of the second PSR 406 by using the included throughput port, and transmits the second $P_{TE}$ to the lightwave beam splitting port of the second PSR 406 by using the included input port.

(3) A Process in which the Polarization Independent Optical Device 400 is Configured to Implement an Optical Signal Pass-Through Function For any of the M add/drop optical paths, the microring 403 included in the add/drop optical path transmits a first $Q_{TE}$ of the plurality of first $Q_{TE}$s that does not meet the resonance condition from the input port of the microring 403 to the throughput port of the microring 403, so as to transmit the first $Q_{TE}$ that does not meet the resonance condition to an input port of a microring included in a next add/drop optical path. When determining that the first $Q_{TE}$ does not meet the resonance condition, the microring of the next add/drop optical path outputs the first $Q_{TE}$ through a throughput port of the microring of the next add/drop optical path. The process proceeds until all the add/drop optical paths determine that the first $Q_{TE}$ does not meet the resonance condition. In this case, a microring of a last add/drop optical path transmits the first QT to the lightwave beam splitting and rotation port of the second PSR 406 by using an included throughput port. Correspondingly, the microring of the last add/drop optical path transmits a first $P_{TE}$ that does not meet the resonance condition to the lightwave beam splitting port of the second PSR 406 by using the included input port.

The second PSR 406 rotates the first $Q_{TE}$ that does not meet the resonance condition to a first $Q_{TM}$, combines the first $Q_{TM}$ and the first $P_{TE}$ that does not meet the resonance condition, and then transmits the combined first $Q_{TM}$ and first $P_{TE}$ to the lightwave transmission port of the first input/output splitter 405 by using the lightwave transmission port included in the second PSR 406. The first input/output splitter 405 outputs the combined first $Q_{TM}$ and first $P_{TE}$ by using the included output port, to obtain an optical signal in the second WDM signal.

For the polarization independent optical device 400 shown in FIG. 4, each add/drop optical path may be configured to drop a first $Q_{TE}$ and a first $P_{TE}$ that meet a resonance condition of a microring included in the add/drop optical path, that is, each add/drop optical path may be configured to drop a desired optical signal. Each add/drop optical path may also be configured to transmit an input optical signal to the input/output preprocessing optical path to obtain an optical signal in the second WDM signal, that is, each add/drop optical path may also be configured to add a desired optical signal. Therefore, when any of the M add/drop optical paths is configured to drop a desired optical signal, another add/drop optical path may be configured to add a desired optical signal. In other words, the polarization independent optical device 400 provided by this embodiment of the present invention can simultaneously drop a desired optical signal and add a desired optical signal.

Figure 5:
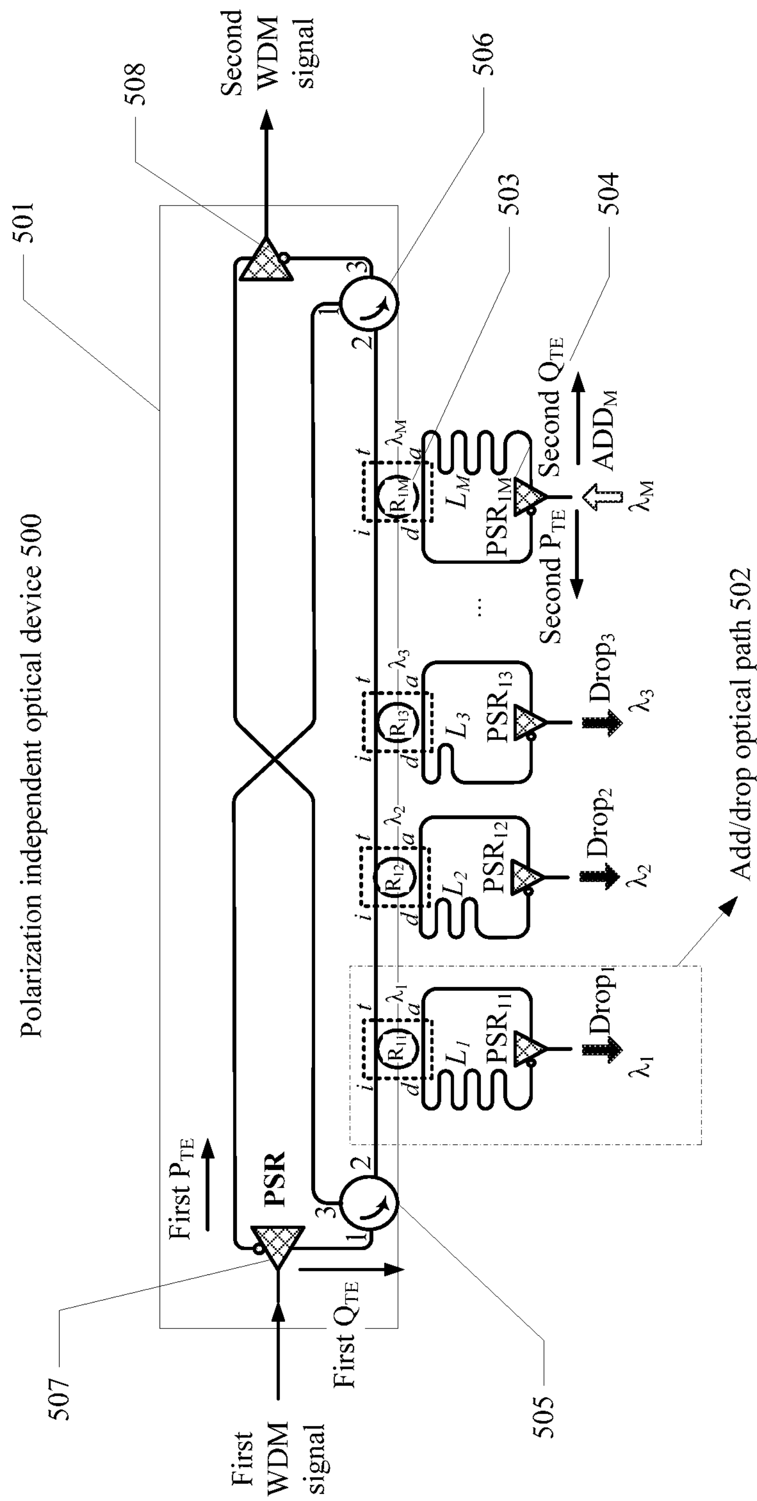
FIG. 5 is a schematic structural diagram of another polarization independent optical device according to an embodiment of the present invention.

FIG. 5 is a schematic structural diagram of another polarization independent optical device 500 according to an embodiment of the present invention. The polarization independent optical device is applied to a scenario in which an input/output splitter included in an input/output preprocessing optical path is a polarization-sensitive optical device. As shown in FIG. 5, the polarization independent optical device 500 includes an input/output preprocessing optical path 501 and M add/drop optical paths 502. Each add/drop optical path includes a microring 503 and a first PSR 504. The input/output preprocessing optical path 501 includes a second input/output splitter 505, a third input/output splitter 506, a third PSR 507, and a fourth PSR 508.

The second input/output splitter 505 and the third input/output splitter 506 each include an input port, an output port, and a lightwave transmission port. The third PSR 507 and the fourth PSR 508 each include a lightwave transmission port, a lightwave beam splitting port, and a lightwave beam splitting and rotation port.

The lightwave beam splitting port of the third PSR 507 is connected to the input port of the second input/output splitter 505, the lightwave beam splitting and rotation port of the third PSR 507 is connected to the input port of the third input/output splitter 506, the output port of the second input/output splitter 505 is connected to the lightwave beam splitting port of the fourth PSR 508, and the lightwave beam splitting and rotation port of the fourth PSR 508 is connected to the output port of the third input/output splitter 506.

The lightwave transmission port of the second input/output splitter 505 is connected to an input port of a microring 503 included in the $1^{st}$ add/drop optical path of the M add/drop optical paths, and the lightwave transmission port of the third input/output splitter 506 is connected to a throughput port of a microring 503 included in the $M^{th}$ add/drop optical path of the M add/drop optical paths.

For the polarization independent optical device shown in FIG. 5, the lightwave transmission port of the third PSR 507 is configured to input a first WDM signal. In other words, the lightwave transmission port of the third PSR 507 is an input port of the input/output preprocessing optical path 501. The lightwave transmission port of the fourth PSR 508 is configured to output a second WDM signal. In other words, the lightwave transmission port of the fourth PSR 508 is an output port of the input/output preprocessing optical path 501.

For specific locations of the ports included in the second input/output splitter 505 and the third input/output splitter 506 in FIG. 5, refer to the structure of the input/output splitter shown in FIG. 2C. For specific locations of the ports included in the third PSR 507 and the fourth PSR 508, refer to the structure of the PSR shown in FIG. 2B.

In addition, a structure of the add/drop optical path of the polarization independent optical device shown in FIG. 5 is the same as that of the add/drop optical path of the polarization independent optical device shown in FIG. 3. Details are not described herein. In addition, for the polarization independent optical device shown in FIG. 5, lengths of two optical transmission paths of two components of an optical signal in the polarization independent optical device also need to be the same. For a specific implementation process, refer to an implementation process of the polarization independent optical device shown in FIG. 3.

The following describes in detail an operating principle of the polarization independent optical device shown in FIG. 5. When the polarization independent optical device shown in FIG. 5 performs add/drop multiplexing on an optical signal, the following three processes are also included.

(1) A Process in which the Polarization Independent Optical Device 500 is Configured to Drop an Optical Signal The third PSR 507 receives the first WDM signal by using the included lightwave transmission port, and processes a plurality of optical signals at different wavelengths in the first WDM signal to obtain a plurality of first $Q_{TE}$s and a plurality of first $P_{TE}$s. The third PSR 507 transmits the plurality of first $Q_{TE}$s to the input port of the second input/output splitter 505 by using the included lightwave beam splitting port, and transmits the plurality of first $P_{TE}$s to the input port of the third input/output splitter 506 by using the included lightwave beam splitting and rotation port. The second input/output splitter 505 transmits, by using the included lightwave transmission port, the plurality of first $Q_{TE}$s to the microrings 503 included in the M add/drop optical paths, and the third input/output splitter 506 transmits, by using the included lightwave transmission port, the plurality of first $P_{TE}$s to the microrings included in the M add/drop optical paths.

Specifically, the second input/output splitter 505 transmits, by using the included lightwave transmission port, the plurality of first $Q_{TE}$s to the input port of the microring 503 included in the $1^{st}$ add/drop optical path of the M add/drop optical paths, and the third input/output splitter 506 transmits, by using the included lightwave transmission port, the plurality of first $P_{TE}$s to the throughput port of the microring included in the $M^{th}$ add/drop optical path of the M add/drop optical paths.

For any of the M add/drop optical paths, the microring 503 included in the add/drop optical path selects a first $Q_{TE}$ that meets a resonance condition from the plurality of first $Q_{TE}$s, and selects a first $P_{TE}$ that meets the resonance condition from the plurality of first $P_{TE}$s. The microring 503 transmits the selected first $Q_{TE}$ to the lightwave beam splitting and rotation port of the first PSR 504 by using an included drop port, and the microring 503 transmits the selected first $P_{TE}$ to the lightwave beam splitting port of the first PSR 504 by using an included add port, so that the first PSR rotates the received first $Q_{TE}$ to a first $Q_{TM}$, combines the first $Q_{TM}$ and the received first $P_{TE}$, and outputs the combined first $Q_{TM}$ and first $P_{TE}$ by using the lightwave transmission port included in the first PSR 504, to obtain a to-be-dropped optical signal.

(2) A Process in which the Polarization Independent Optical Device 500 is Configured to Add an Optical Signal When the first PSR 504 included in any of the M add/drop optical paths shown in FIG. 5 receives an input optical signal, the first PSR 504 processes the input optical signal to obtain a second $Q_{TE}$ and a second $P_{TE}$, and transmits the second $Q_{TE}$ and the second $P_{TE}$ to the microring 503 connected to the first PSR 504. Specifically, the first PSR 504 transmits the second $Q_{TE}$ to the add port of the microring 503 by using the included lightwave beam splitting port, and transmits the second $P_{TE}$ to the drop port of the microring 503 by using the included lightwave beam splitting and rotation port.

The microring 503 transmits the second $Q_{TE}$ to the lightwave transmission port of the third input/output splitter 506, and transmits the second $P_{TE}$ to the lightwave transmission port of the second input/output splitter 505. The third input/output splitter 506 transmits the second $Q_{TE}$ to the lightwave beam splitting and rotation port of the fourth PSR 508 by using the included output port, and the second input/output splitter 505 transmits the second $P_{TE}$ to the lightwave beam splitting port of the fourth PSR 508 by using the included output port. The fourth PSR 508 rotates the second $Q_{TE}$ to a second $Q_{TM}$, combines the second $Q_{TM}$ and the second $P_{TE}$, and outputs the combined second Q M and second $P_{TE}$ by using the lightwave transmission port included in the fourth PSR 508, so as to output an optical signal in the second WDM signal, that is, output a to-be-added optical signal.

(3) A Process in which the Polarization Independent Optical Device 500 is Configured to Implement an Optical Signal Pass-Through Function For any of the M add/drop optical paths, the microring 503 included in the add/drop optical path transmits a first $Q_{TE}$ of the plurality of first $Q_{TE}$s that does not meet the resonance condition from the input port of the microring 503 to the throughput port of the microring 503, so as to transmit the first $Q_{TE}$ that does not meet the resonance condition to an input port of a microring included in a next add/drop optical path. When determining that the first $Q_{TE}$ does not meet the resonance condition, the microring of the next add/drop optical path outputs the first $Q_{TE}$ through a throughput port of the microring of the next add/drop optical path. The process proceeds until all the add/drop optical paths determine that the first $Q_{TE}$ does not meet the resonance condition. In this case, a microring of a last add/drop optical path transmits the first $Q_{TE}$ to the lightwave transmission port of the third input/output splitter 506 by using an included throughput port. Correspondingly, the microring 503 of the last add/drop optical path transmits the first $P_{TE}$ to the lightwave transmission port of the second input/output splitter 505 by using an included input port.

The third input/output splitter 506 transmits the first $Q_{TE}$ that does not meet the resonance condition to the lightwave beam splitting and rotation port of the fourth PSR 508 by using the included output port, and the second input/output splitter 505 transmits the first $P_{TE}$ that does not meet the resonance condition to the lightwave beam splitting port of the fourth PSR 508 by using the included output port. The fourth PSR 508 rotates the first $Q_{TE}$ that does not meet the resonance condition to a first $Q_{TM}$, combines the first $Q_{TM}$ and the first $P_{TE}$ that does not meet the resonance condition, and outputs the combined first $Q_{TM}$ and first $P_{TE}$ by using the lightwave transmission port included in the fourth PSR 508, so as to output an optical signal in the second WDM signal.

For the polarization independent optical device 500 shown in FIG. 5, each add/drop optical path may be configured to drop a first $Q_{TE}$ and a first $P_{TE}$ that meet a resonance condition of a microring included in the add/drop optical path, that is, each add/drop optical path may be configured to drop a desired optical signal. Each add/drop optical path may also be configured to transmit an input optical signal to the input/output preprocessing optical path to obtain an optical signal in the second WDM signal, that is, each add/drop optical path may also be configured to add a desired optical signal. Therefore, when any of the M add/drop optical paths is configured to drop a desired optical signal, another add/drop optical path may be configured to add a desired optical signal. In other words, the polarization independent optical device 500 provided by this embodiment of the present invention can simultaneously drop a desired optical signal and add a desired optical signal.

In the polarization independent optical device shown in the foregoing FIG. 3 to FIG. 5, each add/drop optical path in the polarization independent optical device is configured only to add a desired optical signal or drop a desired optical signal, and the add/drop optical path still cannot simultaneously add an optical signal and drop an optical signal. Therefore, this application further provides an add/drop optical path that can simultaneously add and drop optical signals. The following describes in detail a structure of a polarization independent optical device with this type of add/drop optical path.

Figure 6:
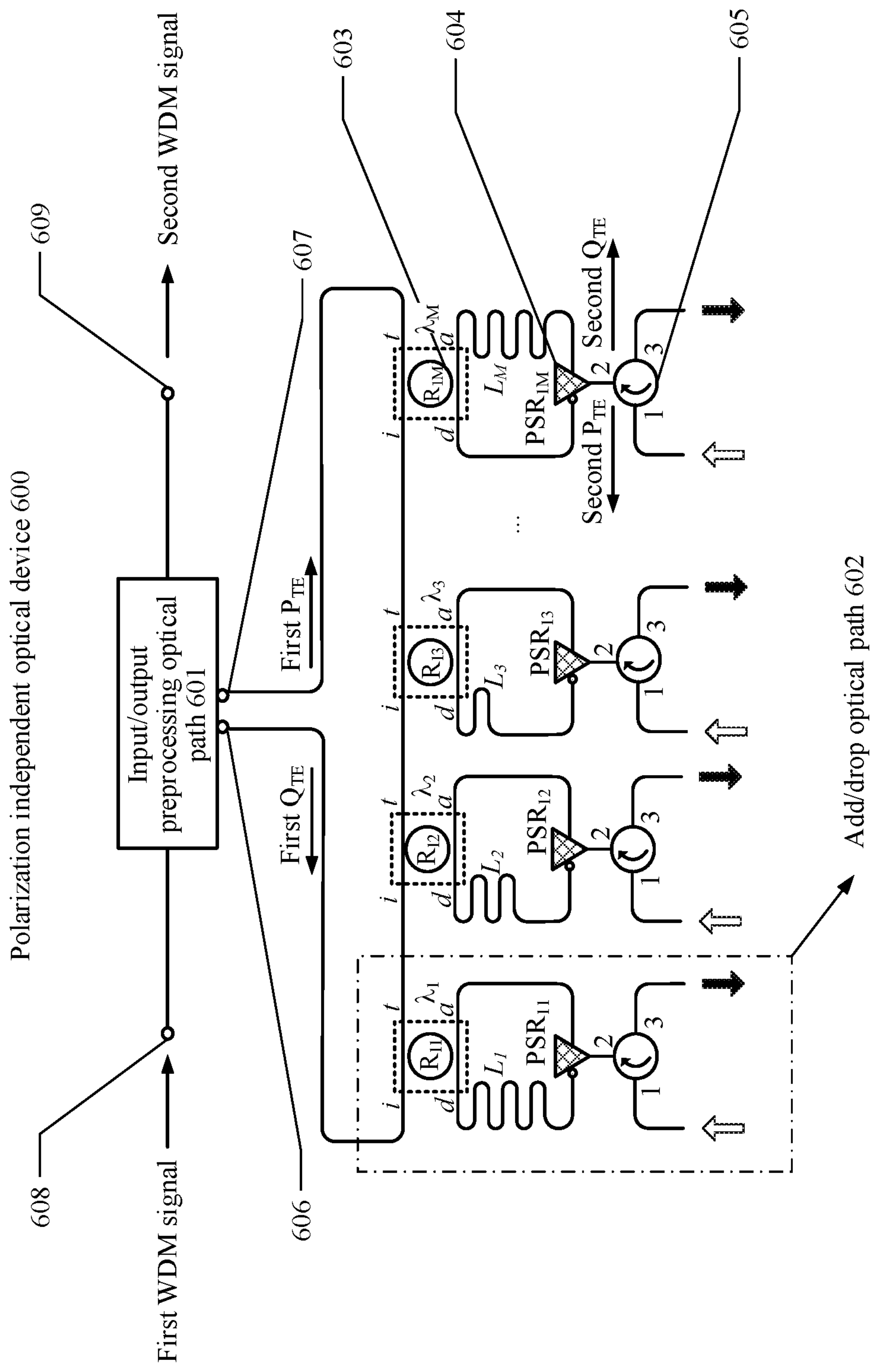
FIG. 6 is a schematic structural diagram of another polarization independent optical device according to an embodiment of the present invention.

FIG. 6 is a schematic structural diagram of another polarization independent optical device 600 according to an embodiment of the present invention. As shown in FIG. 6, the polarization independent optical device 600 includes an input/output preprocessing optical path 601 and M add/drop optical paths 602. Each add/drop optical path includes a microring 603, a first PSR 604, and a fourth input/output splitter 605.

Input ports and throughput ports of M microrings included in the M add/drop optical paths 602 are connected in a head-to-tail manner, a first lightwave transmission port 606 of the input/output preprocessing optical path 601 is connected to an input port of a microring included in the 1$^{st}$ add/drop optical path, and a second lightwave transmission port 607 of the input/output preprocessing optical path 601 is connected to a throughput port of a microring included in the M$^{th}$ add/drop optical path.

For each of the M add/drop optical paths, an add port of the microring 603 included in the add/drop optical path is connected to a lightwave beam splitting port of the first PSR 604 included in the add/drop optical path, and a drop port of the microring 603 included in the add/drop optical path is connected to a lightwave beam splitting and rotation port of the first PSR 604 included in the add/drop optical path. A lightwave transmission port of the first PSR 604 is connected to a lightwave transmission port of the fourth input/output splitter 605. An input port of the fourth input/output splitter 605 is configured to input a to-be-added optical signal, and an output port of the fourth input/output splitter 605 is configured to output a to-be-dropped optical signal.

It should be noted that the input/output preprocessing optical path shown in FIG. 6 may be the input/output preprocessing optical path 401 shown in FIG. 4 or the input/output preprocessing optical path 501 shown in FIG. 5. Therefore, a structure of the input/output preprocessing optical path in FIG. 6 is not described in detail in this embodiment of the present invention. In addition, for specific locations of the ports included in the fourth input/output splitter 605 in FIG. 6, refer to the structure of the input/output splitter shown in FIG. 2C.

For the polarization independent optical device shown in FIG. 6, lengths of two optical transmission paths of two components of an optical signal in the polarization independent optical device also need to be the same. For a specific implementation process, refer to an implementation process of the polarization independent optical device shown in FIG. 3.

The following describes in detail an operating principle of the polarization independent optical device shown in FIG. 6. When the polarization independent optical device shown in FIG. 6 performs add/drop multiplexing on an optical signal, the following three processes are mainly included.

(1) A Process in which the Polarization Independent Optical Device 600 is Configured to Drop an Optical Signal As shown in FIG. 6, an input port 608 of the input/output preprocessing optical path 601 receives a first WDM signal, and processes each of a plurality of optical signals at different wavelengths in the first WDM signal to obtain a plurality of first $Q_{TE}$s and a plurality of first $P_{TE}$s. The input/output preprocessing optical path 601 transmits the obtained plurality of first $Q_{TE}$s and the obtained plurality of first $P_{TE}$s to the microrings 603 included in the M add/drop optical paths. For any of the M add/drop optical paths, the microring 603 included in the add/drop optical path selects a first $Q_{TE}$ that meets a resonance condition from the plurality of first $Q_{TE}$s, selects a first $P_{TE}$ that meets the resonance condition from the plurality of first $P_{TE}$s, transmits the selected first $Q_{TE}$ and the selected first $P_{TE}$ to the first PSR 604, so that the first PSR 604 rotates the received first $Q_{TE}$ to a first $Q_{TM}$, combines the first $Q_{TM}$ and the received first $P_{TM}$, and outputs the combined first $Q_{TM}$ and first $P_{TM}$ by using the included lightwave transmission port. The first PSR 604 transmits the combined first $Q_{TM}$ and first $P_{TM}$ to the lightwave transmission port of the fourth input/output splitter 605 by using the included lightwave transmission port, and the fourth input/output splitter 605 outputs the combined first $Q_{TM}$ and first $P_{TE}$ by using the included output port, so as to output a to-be-dropped optical signal.

For a process in which the input/output preprocessing optical path 601 transmits the obtained plurality of first $Q_{TE}$s and the obtained plurality of first $P_{TE}$s to the first PSR 604, refer to a transmission process of the plurality of first $Q_{TE}$s and the plurality of first $P_{TE}$s in the polarization independent optical device shown in FIG. 3. Details are not described herein again.

(2) A Process in which the Polarization Independent Optical Device 600 is Configured to Add an Optical Signal When the fourth input/output splitter 605 included in any of the M add/drop optical paths shown in FIG. 6 receives an input optical signal by using the included input port, the fourth input/output splitter 605 transmits the input optical signal to the lightwave transmission port of the first PSR 604 by using the included lightwave transmission port. Then, the input optical signal is transmitted to the input/output preprocessing optical path 601 through the first PSR 604 and the microring 603, so as to input the to-be-added optical signal.

For a specific transmission process in which the input optical signal is transmitted to the input/output preprocessing optical path 601 through the first PSR 604 and the microring 603, refer to a transmission process of an optical signal in the polarization independent optical device shown in FIG. 3. Details are not described herein again.

(3) A Process in which the Polarization Independent Optical Device 600 is Configured to Implement an Optical Signal Pass-Through Function Compared with the polarization independent optical device shown in FIG. 3, FIG. 4, or FIG. 5, a main structural difference in the polarization independent optical device 600 is that one PSR is added to each add/drop optical path. However, a transmission optical path for a first $Q_{TE}$ of the plurality of first $Q_{TE}$s that does not meet the resonance condition and a first $P_{TM}$ of the plurality of first $P_{TE}$s that does not meet the resonance condition is not related to another structure, different from the microring, in the add/drop optical path. Therefore, for a process in which the polarization independent optical device shown in FIG. 6 is configured to implement the optical signal pass-through function, refer to the process in which the polarization independent optical device shown in FIG. 3, FIG. 4, or FIG. 5 is configured to implement the optical signal pass-through function.

For the polarization independent optical device 600 shown in FIG. 6, each add/drop optical path may be configured to drop a first $Q_{TE}$ and a first $P_{TE}$ that meet the resonance condition of the microring included in the add/drop optical path, and may also be configured to transmit an input optical signal to the input/output preprocessing optical path to obtain an optical signal in a second WDM signal. In other words, each add/drop optical path may be configured to simultaneously add a desired optical signal and drop a desired optical signal. Therefore, the polarization independent optical device 600 provided by this embodiment of the present invention can simultaneously drop a desired optical signal and add a desired optical signal.

In addition, in this application, polarization independent optical devices of any type of polarization independent optical device shown in FIG. 3 to FIG. 6 may be cascaded to increase a quantity of add channels and a quantity of drop channels of the polarization independent optical device provided by this application. The following describes in detail a structure of a cascaded-into polarization independent optical device.

Figure 7A:
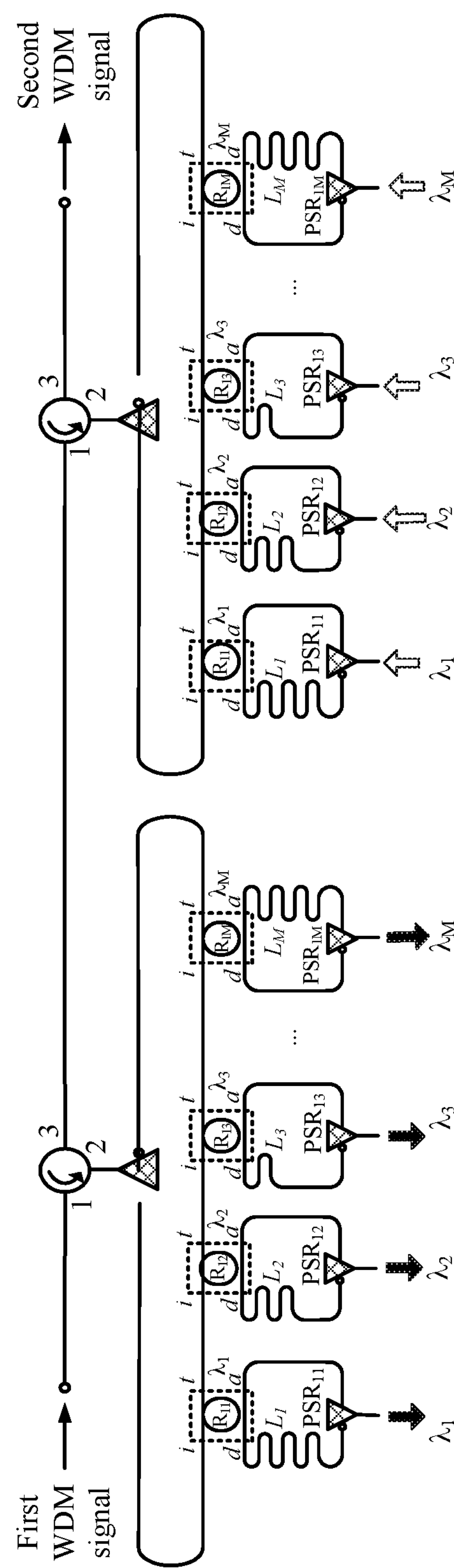
FIG. 7A is a schematic structural diagram of a cascaded-into polarization independent optical device according to an embodiment of the present invention.

FIG. 7A is a schematic structural diagram of a cascaded-into polarization independent optical device 700 according to an embodiment of the present invention. As shown in FIG. 7A, the cascaded-into polarization independent optical device is formed by cascading two polarization independent optical devices shown in FIG. 4. The polarization independent optical device on the left of FIG. 7A may be configured to drop M optical signals at different wavelengths, and the polarization independent optical device on the right of FIG. 7A may be configured to add M optical signals at different wavelengths.

Further, in this application, N polarization independent optical devices shown in FIG. 4 may be simultaneously cascaded. In this case, input ports and output ports of input/output splitters 405 in N polarization independent optical devices shown in FIG. 4 may be directly connected in series according to a series connection manner shown in FIG. 7B(a), to obtain N cascaded polarization independent optical devices. For any of the N polarization independent optical devices, an input port of an input/output splitter of the polarization independent optical device is connected to an output port of a previous input/output splitter connected in series to the input/output splitter of the polarization independent optical device, and an output port of the input/output splitter of the polarization independent optical device is connected to an input port of a next input/output splitter connected in series to the input/output splitter of the polarization independent optical device. In addition, a structure, different from the input/output splitter, in the polarization independent optical device is totally the same as a structure, different from the input/output splitter, in the polarization independent optical device shown in FIG. 4. Details are not described in FIG. 7B(a).

Figure 7B:
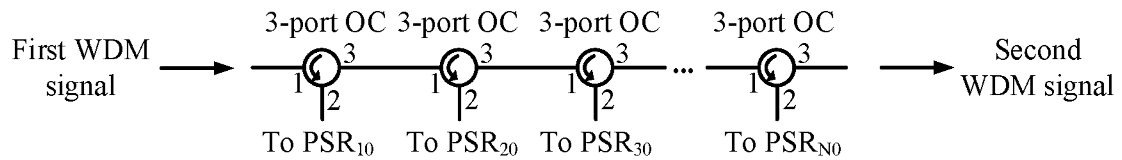
FIG. 7B(a) is a schematic diagram of a cascading manner of a polarization independent optical device according to an embodiment of the present invention.
Figure 7B:
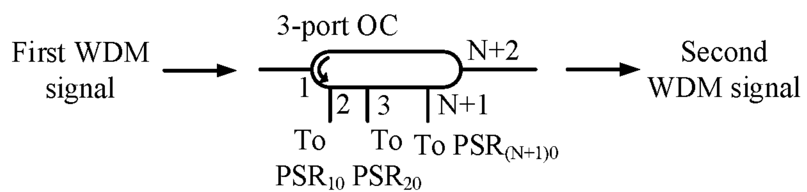

Certainly, an (N+2)-port input/output splitter may be used to replace the structure in FIG. 7B(a), that is, the structure shown in 7B(a) may be replaced with a structure shown in 7B(b).

A transmission manner of a first WDM signal in the cascaded-into polarization independent optical device is basically the same as that of a first WDM signal in a single polarization independent optical device shown in FIG. 4. Details are not described herein again.

In this embodiment of the present invention, two polarization independent optical devices shown in FIG. 4 are connected in series, so that one of the polarization independent optical devices can be configured to add an optical signal and the other polarization independent optical device can be configured to drop an optical signal. Therefore, the cascaded-into polarization independent optical device 700 shown in FIG. 7A can also simultaneously add a desired optical signal and drop a desired optical signal.

Figure 8A:
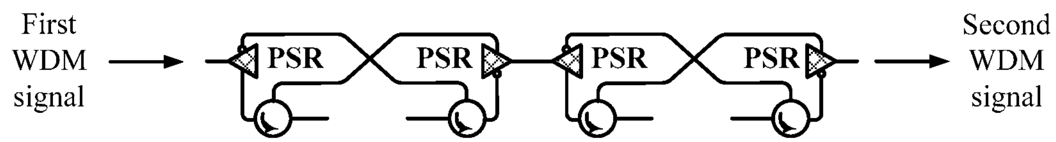
FIG. 8A is a schematic structural diagram of another cascaded-into polarization independent optical device according to an embodiment of the present invention.

FIG. 8A is a schematic structural diagram of another cascaded-into polarization independent optical device 801 according to an embodiment of the present invention. As shown in FIG. 8A, the cascaded-into polarization independent optical device 801 is formed by cascading two polarization independent optical devices 500 shown in FIG. 5. When two polarization independent optical devices 500 shown in FIG. 5 are cascaded, only input/output preprocessing optical paths included in the two polarization independent optical devices shown in FIG. 5 need to be cascaded. Therefore, FIG. 8A includes only a cascading structure of input/output preprocessing optical paths included in the two polarization independent optical devices shown in FIG. 5. For a specific structure of M add/drop optical paths connected to each input/output preprocessing optical path, refer to the add/drop optical path shown in FIG. 5. Details are not described in FIG. 8A.

A transmission manner of a first WDM signal in the cascaded-into polarization independent optical device 801 is basically the same as that of a first WDM signal in a single polarization independent optical device shown in FIG. 5. Details are not described herein again.

Further, if the middle two PSRs are removed from the cascaded-into polarization independent optical device shown in FIG. 8A, functions of the polarization independent optical device are not affected. In this case, a structure of a cascaded-into polarization independent optical device 802 shown in FIG. 8B is obtained.

Figure 8B:
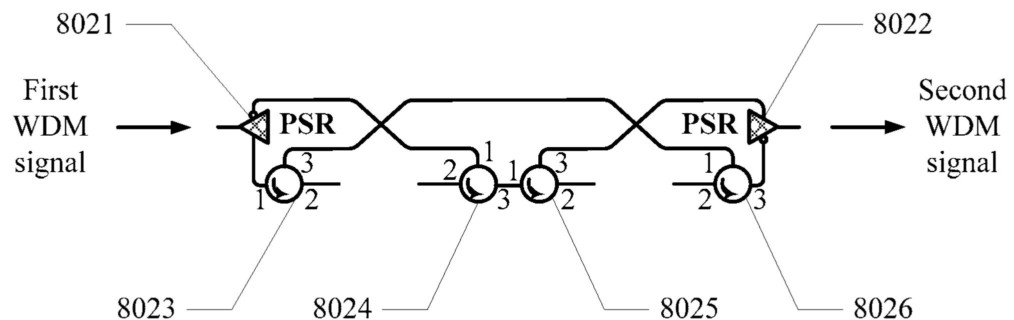
FIG. 8B is a schematic structural diagram of another cascaded-into polarization independent optical device according to an embodiment of the present invention.

As shown in FIG. 8B, the cascaded-into polarization independent optical device 802 includes a PSR 8021, a PSR 8022, an input/output splitter 8023, an input/output splitter 8024, an input/output splitter 8025, and an input/output splitter 8026. An output port of the input/output splitter 8024 is connected to an input port of the input/output splitter 8025, and an output port of the input/output splitter 8023 is connected to an input port of the input/output splitter 8026. A lightwave beam splitting port of the PSR 8021 is connected to an input port of the input/output splitter 8023, and a lightwave beam splitting and rotation port of the PSR 8021 is connected to an input port of the input/output splitter 8024. An output port of the input/output splitter 8025 is connected to a lightwave beam splitting port of the PSR 8022, and an output port of the input/output splitter 8026 is connected to a lightwave beam splitting and rotation port of the PSR 8022.

For specific locations of the ports included in the PSRs and the input/output splitters in FIG. 8B, refer to FIG. 2B and FIG. 2C. Details are not described herein again.

When add/drop multiplexing is performed on a first WDM signal by using the polarization independent optical device shown in FIG. 8B, a desired optical signal is added and/or a desired optical signal is dropped from the first WDM signal by using the PSR 8021, the input/output splitter 8023, the input/output splitter 8024, and M add/drop optical paths connected to the input/output splitter 8023 and the input/output splitter 8024, so as to obtain two components of an optical signal at each wavelength in a third WDM signal. Then, one component of the optical signal at each wavelength in the third WDM signal is transmitted to the input port of the input/output splitter 8026 by using the output port of the input/output splitter 8023, and the other component of the optical signal at each wavelength in the third WDM signal is transmitted to the input port of the input/output splitter 8025 by using the output port of the input/output splitter 8024, so that a desired optical signal is added and/or a desired optical signal is dropped by using M add/drop optical paths connected to the input/output splitter 8025 and the input/output splitter 8026, to obtain a second WDM signal. Then, the second WDM signal is output by using the PSR 8022.

It should be noted that, in FIG. 8B, the M add/drop optical paths connected to the input/output splitter 8023 and the input/output splitter 8024 and the M add/drop optical paths connected to the input/output splitter 8025 and the input/output splitter 8026 may be the M add/drop paths shown in FIG. 5 or the M add/drop paths shown in FIG. 6.

Figure 8C:
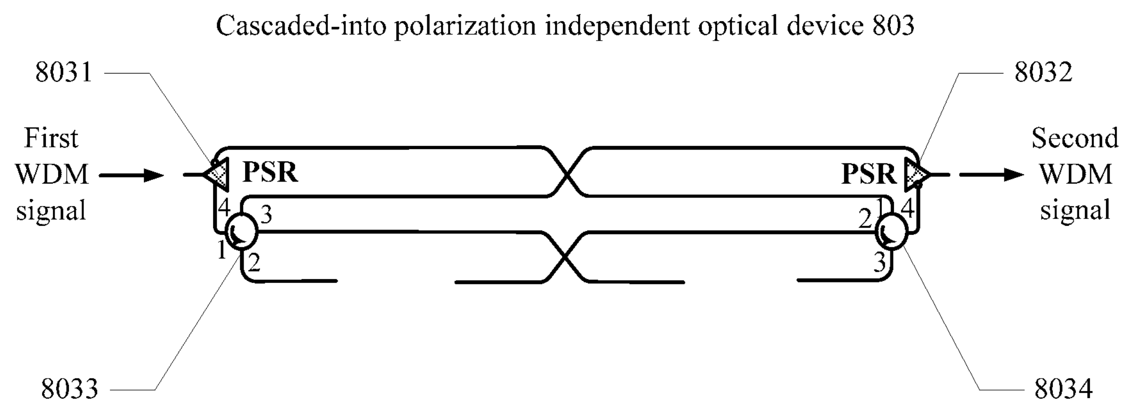
FIG. 8C is a schematic structural diagram of another cascaded-into polarization independent optical device according to an embodiment of the present invention.

Further, for the cascaded-into polarization independent optical device shown in FIG. 8B, the cascading structure shown in FIG. 8B may be further simplified as a cascading structure shown in FIG. 8C, that is, the four 3-port input/output splitters shown in FIG. 8B are replaced with two 4-port input/output splitters.

For ease of description, four ports of the 4-port input/output splitter are referred to as a port 1, a port 2, a port 3, and a port 4. FIG. 8C shows specific port locations. A lightwave beam splitting port of a PSR 8031 is connected to a port 1 of an input/output splitter 8033, a lightwave beam splitting and rotation port of the PSR 8031 is connected to a port 1 of an input/output splitter 8034, a port 4 of the input/output splitter 8033 is connected to a lightwave beam splitting port of a PSR 8032, and the port 4 of the input/output splitter 8034 is connected to a lightwave beam splitting and rotation port of the PSR 8032.

When add/drop multiplexing is performed on a first WDM signal by using the polarization independent optical device shown in FIG. 8C, the PSR 8031 processes the first WDM signal to obtain a plurality of first $Q_{TE}$s and a plurality of first $P_{TE}$s. The PSR 8031 transmits the first $Q_{TE}$s to the port 1 of the input/output splitter 8033 by using the lightwave beam splitting port, and transmits the plurality of first $P_{TE}$s to the port 1 of the input/output splitter 8034 by using the lightwave beam splitting and rotation port. The plurality of first $Q_{TE}$s are output from a port 2 of the input/output splitter 8033, and the plurality of first $P_{TE}$s are output from a port 2 of the input/output splitter 8034. The plurality of first $Q_{TE}$s and the plurality of first $P_{TE}$s are respectively transmitted by using M add/drop optical paths connected to the port 2 of the input/output splitter 8033 and M add/drop optical paths connected to the port 2 of the input/output splitter 8034, so as to add a desired optical signal and/or drop a desired optical signal to obtain $Q_{TE}$s and $P_{TE}$s of optical signals at all wavelengths included in a fourth WDM signal.

The $P_{TE}$s of the optical signals at all wavelengths in the fourth WDM signal are input from the port 2 of the input/output splitter 8033 and output from a port 3 of the input/output splitter 8033. The $Q_{TE}$s of the optical signals at all wavelengths in the fourth WDM signal are input from the port 2 of the input/output splitter 8034 and output from a port 3 of the input/output splitter 8034. The $P_{TE}$s and the $Q_{TE}$s are respectively transmitted by using M add/drop optical paths connected to the port 3 of the input/output splitter 8033 and M add/drop optical paths connected to the port 3 of the input/output splitter 8034, so as to add a desired optical signal and/or drop a desired optical signal to obtain $Q_{TE}$s and $P_{TE}$s of optical signals at different wavelengths included in a second WDM signal.

The $P_{TE}$s of the optical signals at all wavelengths in the second WDM signal are input from the port 3 of the input/output splitter 8033 and output from the port 4 of the input/output splitter 8033, so as to enter the lightwave beam splitting port of the PSR 8032. The $Q_{TE}$s of the optical signals at all wavelengths in the second WDM signal are input from the port 3 of the input/output splitter 8034 and output from the port 4 of the input/output splitter 8034, so as to enter the lightwave beam splitting and rotation port of the PSR 8032. The $Q_{TE}$s and the $P_{TE}$s of the optical signals at different wavelengths included in the second WDM signal are processed and then combined in the PSR 8032, so as to output the second WDM signal.

It should be noted that, in FIG. 8C, the M add/drop optical paths connected to the port 2 of the input/output splitter 8033 and the M add/drop optical paths connected to the port 2 of the input/output splitter 8034, the M add/drop optical paths connected to the port 3 of the input/output splitter 8034, and the M add/drop optical paths connected to the port 3 of the input/output splitter 8034 may be the M add/drop paths shown in FIG. 5 or the M add/drop paths shown in FIG. 6.

Figure 8D:
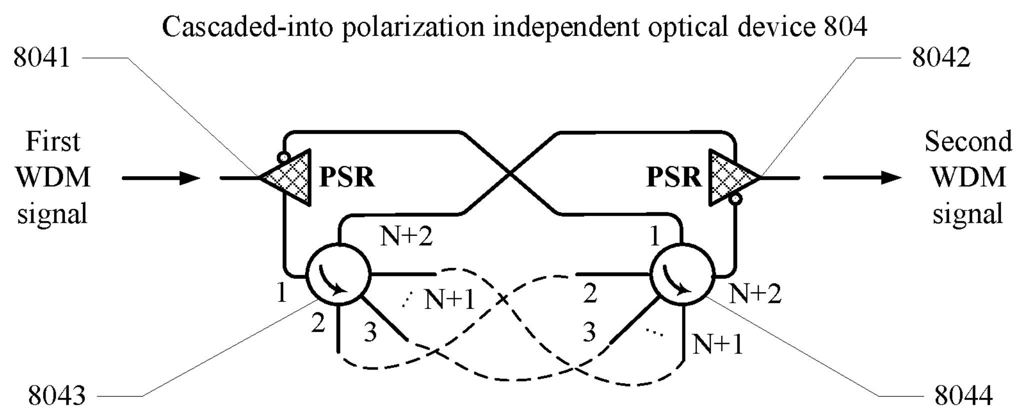
FIG. 8D is a schematic structural diagram of another cascaded-into polarization independent optical device according to an embodiment of the present invention.

Further, N polarization independent optical devices shown in FIG. 5 are cascaded according to a cascading structure connection manner of the polarization independent optical device shown in FIG. 8C, to obtain a cascading structure of the N polarization independent optical devices shown in FIG. 8D. To be specific, the 4-port input/output splitter 8033 and the 4-port input/output splitter 8034 shown in FIG. 8C are replaced with an (N+2)-port input/output splitter 8043 and an (N+2)-port input/output splitter 8044, respectively.

FIG. 8D shows specific locations of the N+2 ports of the input/output splitter 8043 and the N+2 ports of the input/output splitter 8044. A port 1 of the input/output splitter 8043 is connected to a lightwave beam splitting port of a PSR 8041, and a port N+2 of the input/output splitter 8043 is connected to a lightwave beam splitting port of a PSR 8042. A port 1 of the input/output splitter 8044 is connected to a lightwave beam splitting and rotation port of the PSR 8041, and a port N+2 of the input/output splitter 8044 is connected to a lightwave beam splitting and rotation port of the PSR 8042. In addition, M add/drop optical paths are connected between a port i of the input/output splitter 8043 and a port i of the input/output splitter 8044, where $2 \le i \le N+1$.

An implementation in which an optical signal is added and/or dropped from the first WDM signal by using the M add/drop optical paths connected between the port i of the input/output splitter 8043 and the port i of the input/output splitter 8044 is basically the same as an implementation in which the cascaded-into polarization independent optical device shown in FIG. 8C adds and/or drops an optical signal. Details are not described herein again.

It should be noted that the M add/drop optical paths connected between the port i of the input/output splitter 8043 and the port i of the input/output splitter 8044 may be the M add/drop optical paths shown in FIG. 5, or may be the M add/drop optical paths shown in FIG. 6.

In this embodiment of the present invention, two polarization independent optical devices shown in FIG. 5 are connected in series to increase the quantity of channels for adding an optical signal and the quantity for dropping an optical signal. Therefore, the cascaded-into polarization independent optical device 801 shown in FIG. 8A can also simultaneously add a desired optical signal and drop a desired optical signal.

The foregoing descriptions are embodiments provided by this application, but are not intended to limit this application. Any modification, equivalent replacement, or improvement made without departing from the spirit and principle of this application should fall within the protection scope of this application.

What is claimed is:

1. A polarization independent optical device, wherein the polarization independent optical device comprises an input/output preprocessing optical path and M add/drop optical paths, wherein each add/drop optical path comprises a microring and a first polarization splitter and rotator (PSR), and wherein M is greater than 1;

wherein input ports and throughput ports of M microrings comprised in the M add/drop optical paths are connected in a head-to-tail manner, wherein a first lightwave transmission port of the input/output preprocessing optical path is connected to an input port of a microring comprised in the first add/drop optical path, and wherein a second lightwave transmission port of the input/output preprocessing optical path is connected to a throughput port of a microring comprised in the M-th add/drop optical path;

wherein the input/output preprocessing optical path is configured to:

process each of a plurality of optical signals at different wavelengths in an input first wavelength division multiplexing WDM signal to obtain a first $Q_{TE}$ and a first $P_{TE}$; and transmit a plurality of first $Q_{TE}$s and a plurality of first $P_{TE}$s that are obtained through processing to the microrings comprised in the M add/drop optical paths, wherein $Q_{TE}$ indicates a transverse electric (TE) mode of an optical signal, and wherein $P_{TE}$ indicates a TE polarization mode rotated from a transverse magnetic (TM) mode of the optical signal; and wherein for any of the M add/drop optical paths, a microring comprised in the add/drop optical path is connected to a first PSR comprised in the add/drop optical path, and wherein:

the microring comprised in the add/drop optical path is configured to transmit a first $Q_{TE}$ of the plurality of first $Q_{TE}$s that meets a resonance condition and a first $P_{TE}$ of the plurality of first $P_{TE}$s that meets the resonance condition to the first PSR connected to the microring;

the first PSR comprised in the add/drop optical path is configured to process the received first $Q_{TE}$ and the received first $P_{TE}$, and output the processed first $Q_{TE}$ and first $P_{TE}$; and the first PSR comprised in the add/drop optical path is further configured to process an input optical signal to obtain a second $Q_{TE}$ and a second $P_{TE}$, and transmit the second $Q_{TE}$ and the second $P_{TE}$ to the microring connected to the first PSR;

the microring comprised in the add/drop optical path is further configured to transmit the second $Q_{TE}$ and the second $P_{TE}$ to the input/output preprocessing optical path; and the input/output preprocessing optical path is further configured to process the received second $Q_{TE}$ and the received second $P_{TE}$, and output the processed second $Q_{TE}$ and second $P_{TE}$.

2. The polarization independent optical device according to claim 1, wherein the microring comprised in the add/drop optical path is further configured to transmit a first $Q_{TE}$ of the plurality of first $Q_{TE}$s that does not meet the resonance condition and a first $P_{TE}$ of the plurality of first $P_{TE}$s that does not meet the resonance condition to the input/output preprocessing optical path; and wherein the input/output preprocessing optical path is further configured to process the first $Q_{TE}$ that does not meet the resonance condition and the first $P_{TE}$ that does not meet the resonance condition, and output the processed first $Q_{TE}$ and first $P_{TE}$.

3. The polarization independent optical device according to claim 1, wherein the input/output preprocessing optical path comprises a first input/output splitter and a second PSR, and wherein the first input/output splitter is a polarization-insensitive optical device;

wherein the first input/output splitter comprises an input port, an output port, and a lightwave transmission port, and wherein the second PSR comprises a lightwave transmission port, a lightwave beam splitting port, and a lightwave beam splitting and rotation port;

wherein the lightwave transmission port of the first input/output splitter is connected to the lightwave transmission port of the second PSR, wherein the lightwave beam splitting port of the second PSR is connected to the input port of the microring comprised in the first add/drop optical path of the M add/drop optical paths, and wherein the lightwave beam splitting and rotation port of the second PSR is connected to the throughput port of the microring comprised in the M-th add/drop optical path of the M add/drop optical paths;

wherein the first input/output splitter is configured to transmit the first WDM signal received by the comprised input port to the second PSR by using the lightwave transmission port comprised in the first input/output splitter;

wherein the second PSR is configured to:

process the plurality of optical signals at different wavelengths in the first WDM signal received by the comprised lightwave transmission port to obtain the plurality of first $Q_{TES}$ and the plurality of first $P_{TES}$;

transmit, by using the lightwave beam splitting port comprised in the second PSR, the plurality of first $Q_{TE}$s to the input port of the microring comprised in the first add/drop optical path; and transmit, by using the lightwave beam splitting port comprised in the second PSR, the plurality of first $P_{TE}$s to the throughput port of the microring comprised in the M-th add/drop optical path; and wherein the second PSR is further configured to:

rotate the second $Q_{TE}$ received by the comprised lightwave beam splitting and rotation port to a second $Q_{TM}$;

combine the second $Q_{TM}$ and the second $P_{TE}$ received by the lightwave beam splitting port comprised in the second PSR; and transmit the combined second $Q_{TM}$ and second $P_{TE}$ to the lightwave transmission port of the first input/output splitter by using the lightwave transmission port comprised in the second PSR; and wherein the first input/output splitter is further configured to output the combined second $Q_{TM}$ and second $P_{TE}$ by using the output port comprised in the first input/output splitter, wherein $Q_{TM}$ is a TM polarization mode rotated from $Q_{TE}$.

4. The polarization independent optical device according to claim 1, wherein the input/output preprocessing optical path comprises a second input/output splitter, a third input/output splitter, a third PSR, and a fourth PSR, wherein both the second input/output splitter and the third input/output splitter are polarization-sensitive optical devices;

wherein the second input/output splitter and the third input/output splitter each comprise an input port, an output port, and a lightwave transmission port, and wherein the third PSR and the fourth PSR each comprise a lightwave transmission port, a lightwave beam splitting port, and a lightwave beam splitting and rotation port;

wherein the lightwave beam splitting port of the third PSR is connected to the input port of the second input/output splitter, wherein the lightwave beam splitting and rotation port of the third PSR is connected to the input port of the third input/output splitter, wherein the output port of the second input/output splitter is connected to the lightwave beam splitting port of the fourth PSR, and wherein the lightwave beam splitting and rotation port of the fourth PSR is connected to the output port of the third input/output splitter;

wherein the lightwave transmission port of the second input/output splitter is connected to the input port of the microring comprised in the first add/drop optical path of the M add/drop optical paths, and wherein the lightwave transmission port of the third input/output splitter is connected to the throughput port of the microring comprised in the M-th add/drop optical path of the M add/drop optical paths;

wherein the third PSR is configured to:

process the plurality of optical signals at different wavelengths in the first WDM signal received by the comprised lightwave transmission port to obtain the plurality of first $Q_{TES}$ and the plurality of first $P_{TES}$;

transmit the plurality of first $Q_{TE}$s to the input port of the second input/output splitter by using the lightwave beam splitting port comprised in the third PSR; and transmit the plurality of first $P_{TE}$s to the input port of the third input/output splitter by using the lightwave beam splitting and rotation port comprised in the third PSR;

wherein the second input/output splitter is configured to transmit, by using the comprised lightwave transmission port, the plurality of first $Q_{TE}$s to the microrings comprised in the M add/drop optical paths;

wherein the third input/output splitter is configured to transmit, by using the comprised lightwave transmission port, the plurality of first $P_{TE}$s to the microrings comprised in the M add/drop optical paths;

wherein the third input/output splitter is further configured to receive the second $Q_{TE}$ by using the comprised lightwave transmission port, and transmit the second $Q_{TE}$ to the lightwave beam splitting and rotation port of the fourth PSR by using the output port comprised in the third input/output splitter;

wherein the second input/output splitter is further configured to receive the second $P_{TE}$ by using the comprised lightwave transmission port, and transmit the second PT to the lightwave beam splitting port of the fourth PSR by using the output port comprised in the second input/output splitter; and wherein the fourth PSR is further configured to rotate the second $Q_{TE}$ to a second $Q_{TM}$, combine the second $Q_{TM}$ and the second $P_{TE}$, and output the combined second $Q_{TM}$ and second $P_{TE}$ by using the lightwave transmission port comprised in the fourth PSR.

5. The polarization independent optical device according to claim 1, wherein the microring comprised in the add/drop optical path further comprises an add port and a drop port, and wherein the first PSR comprised in the add/drop optical path comprises a lightwave transmission port, a lightwave beam splitting port, and a lightwave beam splitting and rotation port;

wherein the add port of the microring comprised in the add/drop optical path is connected to the lightwave beam splitting port of the first PSR comprised in the add/drop optical path, and wherein the drop port of the microring comprised in the add/drop optical path is connected to the lightwave beam splitting and rotation port of the first PSR comprised in the add/drop optical path;

wherein the first PSR is configured to:

rotate the first $Q_{TE}$ that is received by the comprised lightwave beam splitting and rotation port and that meets the resonance condition to a first $Q_{TM}$, combine the first $Q_{TM}$ and the first $P_{TE}$ that is received by the lightwave beam splitting port and that meets the resonance condition; and output the combined first $Q_{TM}$ and first $P_{TE}$ by using the lightwave transmission port comprised in the first PSR; and wherein the first PSR is further configured to:

process the optical signal input by the comprised lightwave transmission port to obtain the second $Q_{TE}$ and the second $P_{TE}$;

transmit the second $Q_{TE}$ to the add port of the microring by using the lightwave beam splitting port comprised in the first PSR; and transmit the second $P_{TE}$ to the drop port of the microring by using the lightwave beam splitting port comprised in the first PSR.

6. The polarization independent optical device according to claim 5, wherein the add/drop optical path further comprises a fourth input/output splitter;

wherein the fourth input/output splitter comprises an input port, an output port, and a lightwave transmission port;

wherein the lightwave transmission port of the first PSR is connected to the lightwave transmission port of the fourth input/output splitter; and wherein the input port of the fourth input/output splitter is configured to input a to-be-added optical signal, and wherein the output port of the fourth input/output splitter is configured to output a to-be-dropped optical signal.

7. The polarization independent optical device according to claim 1, wherein the microring is a resonance wavelength tunable microring, and wherein a free spectral range FSR of the microring covers wavelengths of all optical signals comprised in the first WDM signal and a second WDM signal, wherein the second WDM signal is an optical signal output from the polarization independent optical device.

8. The polarization independent optical device according to claim 1, further comprising: a first input/output splitter; a second input/output splitter; a third input/output splitter; and a fourth input/output splitter, wherein any one of the first input/output splitter, the second input/output splitter, the third input/output splitter, and the fourth input/output splitter is a multi-port optical circulator or a multi-port coupler.

9. The polarization independent optical device according to claim 1, wherein an optical transmission path length, in the polarization independent optical device, of the first $Q_{TE}$ of the plurality of first $Q_{TE}$s that meets the resonance condition is the same as an optical transmission path length, in the polarization independent optical device, of the first $P_{TE}$ of the plurality of first $P_{TE}$s that meets the resonance condition;

wherein an optical transmission path length, in the polarization independent optical device, of the first $Q_{TE}$ of the plurality of first $Q_{TE}$s that does not meet the resonance condition is the same as an optical transmission path length, in the polarization independent optical device, of the first $P_{TE}$ of the plurality of first $P_{TE}$s that does not meet the resonance condition; and wherein an optical transmission path length of the second $Q_{TE}$ in the polarization independent optical device is the same as an optical transmission path length of the second $P_{TE}$ in the polarization independent optical device.

* * * * *

UNITED STATES PATENT AND TRADEMARK OFFICE

CERTIFICATE OF CORRECTION

PATENT NO. : 10,735,124 B2
APPLICATION NO. : 16/441658
DATED : August 4, 2020
INVENTOR(S) : Ruiqiang Ji et al.

It is certified that error appears in the above-identified patent and that said Letters Patent is hereby corrected as shown below:

In the Claims

In Column 29, Line 4, in Claim 4, delete "PT" and insert -- $P_{TE}$ --, therefor.

In Column 30, Line 16, in Claim 7, delete "FSR" and insert -- (FSR) --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*